US012580945B2

(12) United States Patent
Hittel et al.

(10) Patent No.: US 12,580,945 B2
(45) Date of Patent: *Mar. 17, 2026

(54) SIMULATION AND VISUALIZATION OF MALWARE SPREAD THROUGH SHARING OF DATA OBJECTS IN CLOUD APPLICATIONS

(71) Applicant: Netskope, Inc., Santa Clara, CA (US)

(72) Inventors: Sean Hittel, Calgary (CA); Ravindra K. Balupari, San Jose, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,543

(22) Filed: Jun. 4, 2024

(65) Prior Publication Data

US 2024/0323221 A1     Sep. 26, 2024

Related U.S. Application Data

(63) Continuation of application No. 18/345,307, filed on Jun. 30, 2023, now Pat. No. 12,041,074, which is a
(Continued)

(51) Int. Cl.
*H04L 9/40* (2022.01)
*G06F 16/176* (2019.01)
(Continued)

(52) U.S. Cl.
CPC ........ *H04L 63/1433* (2013.01); *G06F 16/176* (2019.01); *G06F 21/56* (2013.01);
(Continued)

(58) Field of Classification Search
CPC ... H04L 63/1433; H04L 63/145; H04L 67/10; G06F 16/176; G06F 21/56; G06F 21/577; G06F 21/6218
See application file for complete search history.

(56) References Cited

U.S. PATENT DOCUMENTS 5,440,723 A    8/1995  Arnold et al.
6,513,122 B1   1/2003  Magdych et al.
(Continued)

FOREIGN PATENT DOCUMENTS

EP        1063833 A2    12/2000

OTHER PUBLICATIONS

Pham, Luan Huy; Albanese, Massimiliano; Venkatesan, Sridhar; "A Quantitative Risk Assessment Framework for Adaptive Intrusion Detection in the Cloud", IEEE Conference on Communications and Network Security (CNS), IEEE, Oct. 17-19, 2016, 9 pages.*
(Continued)

*Primary Examiner* — Victor Lesniewski

(57) ABSTRACT
The technology disclosed relates to simulating spread of a malware in cloud applications. In particular, the technology disclosed relates to accessing sharing data for files shared between users via sync and share mechanisms of cloud applications, tracing connections between the users by traversing a directed graph constructed based on the sharing data, and simulating spread of a malware based on the traced connections to simulate user exposure to, infection by, and transmission of the malware. The connections are created as a result of syncing and sharing the files via the sync and share mechanisms. The malware is spread by syncing and sharing of infected ones of the files via the sync and share mechanisms.

20 Claims, 14 Drawing Sheets
(7 of 14 Drawing Sheet(s) Filed in Color)

Related U.S. Application Data continuation of application No. 17/110,132, filed on Dec. 2, 2020, now Pat. No. 11,736,509, which is a continuation of application No. 15/911,034, filed on Mar. 2, 2018, now Pat. No. 10,862,916.

(60) Provisional application No. 62/480,542, filed on Apr. 3, 2017.

(51) Int. Cl.

| | |
|---|---|
| *G06F 21/56* | (2013.01) |
| *G06F 21/57* | (2013.01) |
| *G06F 21/62* | (2013.01) |
| *H04L 67/10* | (2022.01) |

(52) U.S. Cl.

CPC ........ *G06F 21/577* (2013.01); *G06F 21/6218* (2013.01); *H04L 63/145* (2013.01); *H04L 67/10* (2013.01); *G06F 2221/034* (2013.01)

(56) References Cited

U.S. PATENT DOCUMENTS

| | | | |
|---|---|---|---|
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,735,116 | B1 | 6/2010 | Gauvin |
| 7,966,654 | B2 | 6/2011 | Crawford |
| 8,000,329 | B2 | 8/2011 | Fendick et al. |
| 8,296,178 | B2 | 10/2012 | Hudis et al. |
| 8,566,932 | B1 * | 10/2013 | Hotta ................... G06F 21/567 |
| | | | 726/22 |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,405,904 | B1 * | 8/2016 | Fang ...................... H04L 63/00 |
| 9,460,179 | B1 * | 10/2016 | Gunaratne ............ G06F 16/168 |
| 9,537,884 | B1 * | 1/2017 | Raugas ............... H04L 63/1433 |
| 9,674,210 | B1 * | 6/2017 | Oprea ................. H04L 63/1433 |
| 9,811,662 | B2 | 11/2017 | Sharpe et al. |
| 10,084,825 | B1 | 9/2018 | Xu |
| 10,142,362 | B2 * | 11/2018 | Weith ...................... H04L 63/20 |
| 10,178,120 | B1 * | 1/2019 | Keegan ............... H04L 63/1433 |
| 10,237,282 | B2 | 3/2019 | Nelson et al. |
| 10,277,625 | B1 * | 4/2019 | Efstathopoulos ... H04L 63/1433 |
| 10,320,829 | B1 * | 6/2019 | Banga ................. H04L 63/1433 |
| 10,334,442 | B2 | 6/2019 | Vaughn et al. |
| 10,382,468 | B2 | 8/2019 | Dods |
| 10,440,036 | B2 * | 10/2019 | Pal ...................... H04L 63/1416 |
| 10,484,334 | B1 | 11/2019 | Lee et al. |
| 10,805,340 | B1 * | 10/2020 | Goradia ............... H04L 63/145 |
| 10,826,941 | B2 | 11/2020 | Jain et al. |
| 10,862,916 | B2 * | 12/2020 | Hittel ................... G06F 21/577 |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 11,736,509 | B2 * | 8/2023 | Hittel ................... G06F 21/577 |
| | | | 726/25 |
| 12,041,074 | B2 * | 7/2024 | Hittel ................. H04L 63/1433 |
| 2002/0091532 | A1 * | 7/2002 | Viets ................... H04L 63/0428 |
| | | | 726/15 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |

| | | | |
|---|---|---|---|
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0100077 | A1 * | 4/2009 | Jung ................... H04L 63/1433 |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0174256 | A1 * | 7/2013 | Powers ................. H04L 63/145 |
| | | | 726/23 |
| 2013/0268994 | A1 * | 10/2013 | Cooper ................... H04L 63/10 |
| | | | 726/1 |
| 2013/0298190 | A1 | 11/2013 | Sikka et al. |
| 2013/0298192 | A1 * | 11/2013 | Kumar ............... H04L 63/1425 |
| | | | 726/25 |
| 2013/0347085 | A1 * | 12/2013 | Hawthorn ............. G06F 21/577 |
| | | | 726/6 |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0181971 | A1 * | 6/2014 | Tatarinov .............. G06F 21/316 |
| | | | 726/23 |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0007331 | A1 * | 1/2015 | Pfeifer, Jr. .......... H04L 63/1433 |
| | | | 726/25 |
| 2015/0100357 | A1 | 4/2015 | Seese et al. |
| 2015/0205973 | A1 * | 7/2015 | Huh .................... G06F 21/6218 |
| | | | 726/16 |
| 2015/0347447 | A1 * | 12/2015 | Ho ......................... G06F 16/178 |
| | | | 707/622 |
| 2016/0078229 | A1 * | 3/2016 | Gong .................... G06F 21/577 |
| | | | 726/24 |
| 2016/0134653 | A1 * | 5/2016 | Vallone ................. H04L 41/046 |
| | | | 726/25 |
| 2016/0188880 | A1 * | 6/2016 | Smith .................. G06F 21/577 |
| | | | 726/23 |
| 2016/0253352 | A1 * | 9/2016 | Kluck ................. H04L 67/1095 |
| | | | 707/638 |
| 2016/0306980 | A1 * | 10/2016 | Kotler ................... G06F 21/577 |
| 2016/0323318 | A1 | 11/2016 | Terrill et al. |
| 2016/0330219 | A1 * | 11/2016 | Hasan .................. G01C 21/387 |
| 2016/0350145 | A1 | 12/2016 | Botzer et al. |
| 2016/0350539 | A1 * | 12/2016 | Oberheide .............. H04L 63/20 |
| 2016/0366167 | A1 * | 12/2016 | Yumer ............... H04L 63/1433 |
| 2017/0064005 | A1 | 3/2017 | Lee |
| 2017/0093917 | A1 | 3/2017 | Chandra et al. |
| 2017/0206353 | A1 * | 7/2017 | Jai ......................... G06F 21/565 |
| 2017/0213037 | A1 * | 7/2017 | Toledano ............... H04L 63/06 |
| 2017/0250951 | A1 | 8/2017 | Wang et al. |
| 2017/0251013 | A1 * | 8/2017 | Kirti ................... H04L 63/1441 |
| 2017/0286229 | A1 * | 10/2017 | Cheung ............. G06F 11/1474 |
| 2017/0286690 | A1 * | 10/2017 | Chari .................... G06F 21/577 |
| 2017/0302685 | A1 * | 10/2017 | Ladnai .................. H04L 63/145 |
| 2017/0366570 | A1 * | 12/2017 | Wisdom .................. H04L 63/14 |
| 2018/0020018 | A1 * | 1/2018 | Walheim ............... G06F 21/577 |
| 2018/0048668 | A1 * | 2/2018 | Gupta ................. H04L 63/1425 |
| 2018/0048669 | A1 * | 2/2018 | Lokamathe .............. G06N 5/04 |
| 2018/0146004 | A1 * | 5/2018 | Belfiore, Jr. ........ H04L 63/1433 |
| 2018/0181761 | A1 * | 6/2018 | Sinha ................... G06F 21/577 |
| 2018/0190146 | A1 * | 7/2018 | Bodnarium ......... H04L 63/1441 |
| 2018/0191727 | A1 * | 7/2018 | Baldwin ............. H04L 43/0876 |
| 2018/0191771 | A1 * | 7/2018 | Newman ................. H04L 63/20 |
| 2018/0239902 | A1 * | 8/2018 | Godard ................... G06F 21/53 |
| 2018/0248896 | A1 * | 8/2018 | Challita ................ G06F 21/554 |
| 2018/0293330 | A1 * | 10/2018 | Kovác .................... G06F 21/56 |

(56) References Cited

U.S. PATENT DOCUMENTS

| 2019/0050563 | A1* | 2/2019 | Sander | ......... | G06F 16/287 |
| 2020/0050686 | A1 | 2/2020 | Kamalapuram et al. | | |

OTHER PUBLICATIONS

Bardia, Vivek; Kumar, C.R.S.; "Process trees & service chains can serve us to mitigate zero day attacks better," 2017 International Conference on Data Management, Analytics and Innovation (ICDMAI), Pune, India, Feb. 24-26, 2017, pp. 280-284.*

Faghani, Mohammad R.; Matrawy, Ashraf; Lung, Chung-Horng; "A Study of Trojan Propagation in Online Social Networks," 2012 5th International Conference on New Technologies, Mobility and Security (NTMS), Istanbul, Turkey, May 7-10, 2012, pp. 1-5.*

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

Mccullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric, The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/".

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-, What are the different email protocols%3F, and also has defined functions.

Niit, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet, FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

Lee et al., "A Data Mining Framework for Building Intrusion Detection Models," Columbia University, 1999 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al., "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." filed May 8, 2017, 87 pgs.

Song et al., "Practical techniques for searches on encrypted data," In Proceeding 2000 IEEE symposium on security and privacy. S&P 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

* cited by examiner

200
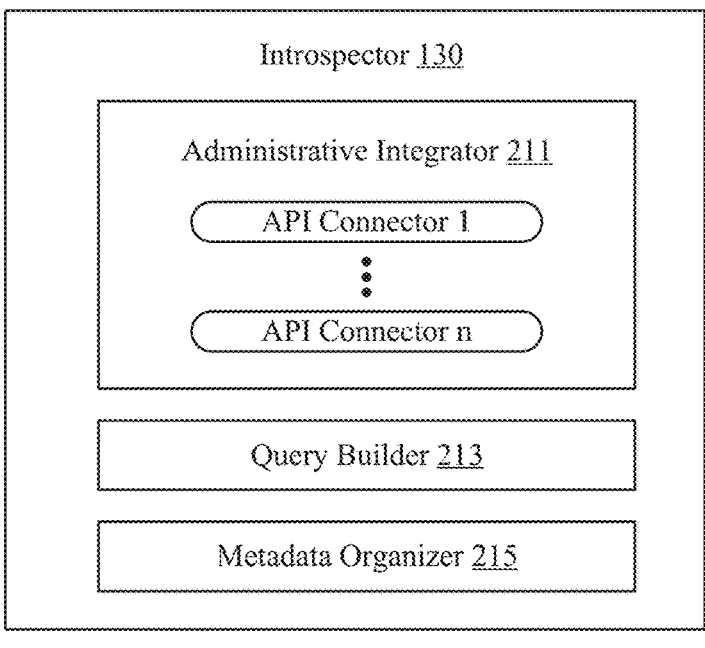
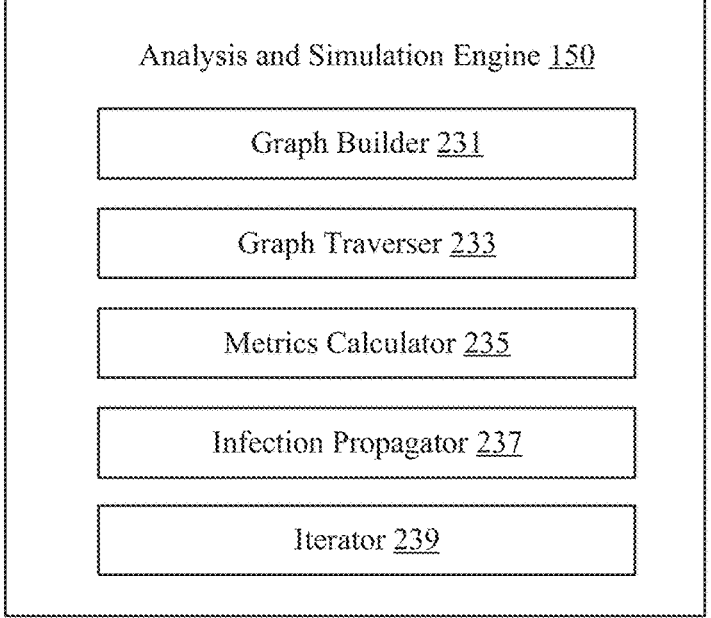
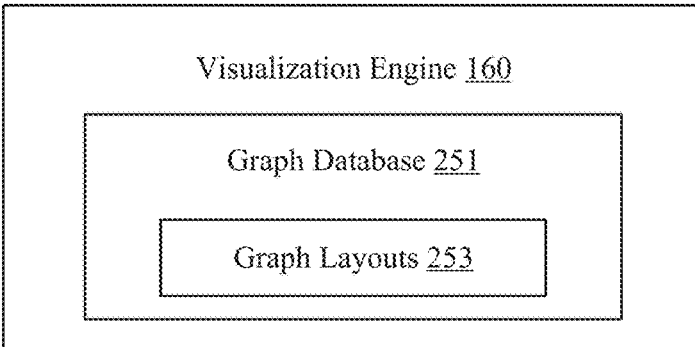
FIG. 2

300

```
{
302 ———  "_id" : "7f47d93960fa18234d9bd324",
304 ———  "ap" : "Dropbox",
306 ———  "User Id" : "dbmid:AAC3pJdyx792vptgc3fOCs_RPiqgjattv9k",
         "acm" : "API Connector",
         "_tid" : "1001",
         "apc" : "Cloud Storage",
         "alr" : "no",
         "_cts" : ISODate("2017-02-16T09:34:32.609Z"),
         "inid" : "Sumoskope",
         "sip" : "182.73.130.70",
         "ty" : "nspolicy",
         "ts" : 1487238383,
308 ———  "User Name" : "Rama Rao",
         "tid" : 70006,
310 ———  "urip" : "182.73.130.70",
312 ———  "oid" : "/000000000000/10MB-Self-Text.txt",
314 ———  "act" : "Share",
         "cnid" : NumberLong("24404313671812"),
         "br" : "unknown",
         "dv" : "unknown",
         "fur" : "ramarao@netskope.com",
         "_its" : 1487238872,
         "obt" : "File",
         "sz" : "",
         "obj" : "/000000000000/10MB-Self-Text.txt",
         "sr" : "19",
         "session_id" : NumberLong("142293801094273"),
         "ur" : "ramarao@netskope.com",
         "ccl" : "high",
         "uk" : "ramarao@netskope.com",
         "sl" : "Bangalore",
         "sc" : "India",
         "_ssbg" : 1,
         "ou" : "",
316 ———  "os" : "iOS",
318 ———  "slc" : [
                 77.3833,
                 12.9833
         ]
}
```

402   { "_id" : "fb3c0d72b9ee2d50d05f6a321368a8869cb14d7a", "usage" : 0, "lut" :
1490125228, "name" : "ghostking", "appname" : "box", "updt" : 1490125222,
"instance" : "nammazone", "isAdmin" : "False", "user" : "sateesh+box@netskope.com",
"lastLoginTime" : null, "uid" : "262054341"

404   { "_id" : "1bf1baedaf31ee1676715b000a32899ba2618293", "usage" : 0, "lut" :
1490125229, "name" : "Shreekumar B", "appname" : "box", "updt" : 1490125222,
"instance" : "nammazone", "isAdmin" : "False", "user" :
"shreekumar_b@outlook.com", "lastLoginTime" : null, "uid" : "1264837589" }

502 { "_id" : "74114882302", "mimeType" : "application/vnd.openxmlformats-officedocument.wordprocessingml.document", "uid" : "257490553", "links" : 0, "filePath" : [ "/All Files/AA_July13_Expire/ByKelly.docx" ], "app" : "Box", "sharedType" : "private", "tenantid" : "1001", "modifiedDate" : 1468407264, "createdDate" : 1468407264, "user" : "gbansal@netskope.com", "domain_shared_with" : ["acme.com"], "lut" : 1489556095, "title" : "ByKelly.docx", "fileType" : "Documents", "appname" : "box", "method" : "hoard", " : "ownership" : "isInternallyOwned", "collaborated" : "notCollaborated", "instance" : "nammazone", "parentId" : "8829464034", "pathId" : "74114882302", "shared" : [], "public" : [], "fileSize" : 15178, "access_method" : [ "API Connector" ] }

504 { "_id" : "11661721358", "mimeType" : "resource/folder", "uid" : "213716996", "links" : 0, "filePath" : [ "/All Files/dev/DLP-PCI" ], "app" : "Box", "sharedType" : "private", "tenantid" : "1001", "modifiedDate" : 1478069485, "createdDate" : 1476270395, "user" : "admin@nammazone.com", "domain_shared_with" : [], "lut" : 1478603664, "title" : "DLP-PCI", "fileType" : "Folder", "appname" : "box", "method" : "hoard", "collaborated" : "isInternallyOwned", "instance" : "nammazone", "parentId" : "8339082893", "pathId" : "11661721358", "shared" : [], "public" : [], "fileSize" : 91828, "access_method" : [ "API Connector" ] }

506 { "_id" : "11137246890", "mimeType" : "resource/folder", "uid" : "213716996", "links" : 0, "filePath" : [ "/All Files/dev/DLP-SourceCode" ], "app" : "Box", "sharedType" : "external", "tenantid" : "1001", "modifiedDate" : 1472643018, "createdDate" : 1472642989, "user" : "admin@nammazone.com", "domain_shared_with" : [ "gmail.com" ], "lut" : 1478757311, "title" : "DLP-SourceCode", "fileType" : "Folder", "appname" : "box", "method" : "hoard", "ownership" : "isInternallyOwned", "collaborated" : "collaborated", "instance" : "nammazone", "parentId" : "8339082893", "pathId" : "11137246890", "shared" : [], "public" : [ "bala@gmail.com" ], "fileSize" : 106061, "access_method" : [ "API Connector" ] }

508 { "_id" : "11137086924", "mimeType" : "resource/folder", "uid" : "213716996", "links" : 1, "filePath" : [ "/All Files/dev/DLP-PHI" ], "app" : "Box", "sharedType" : "internal", "tenantid" : "1001", "modifiedDate" : 1476875787, "createdDate" : 1472643019, "user" : "admin@nammazone.com", "domain_shared_with" : [], "lut" : 1478603660, "title" : "DLP-PHI", "fileType" : "Folder", "appname" : "box", "method" : "hoard", "collaborated" : "notCollaborated", "instance" : "nammazone", "parentId" : "8339082893", "pathId" : "11137086924", "shared" : [ "Everyone in Organization" ], "public" : [], "fileSize" : 880558, "access_method" : [ "API Connector" ] }

510 { "_id" : "11137560128", "mimeType" : "resource/folder", "uid" : "213716996", "links" : 0, "filePath" : [ "/All Files/dev/DLP-PII" ], "app" : "Box", "sharedType" : "private", "tenantid" : "1001", "modifiedDate" : 1476252023, "createdDate" : 1472642964, "user" : "admin@nammazone.com", "domain_shared_with" : [], "lut" : 1478603661, "title" : "DLP-PII", "fileType" : "Folder", "appname" : "box", "method" : "hoard", "collaborated" : "notCollaborated", "instance" : "nammazone", "parentId" : "8339082893", "pathId" : "11137560128", "shared" : [], "public" : [], "fileSize" : 217695, "access_method" : [ "API Connector" ] }

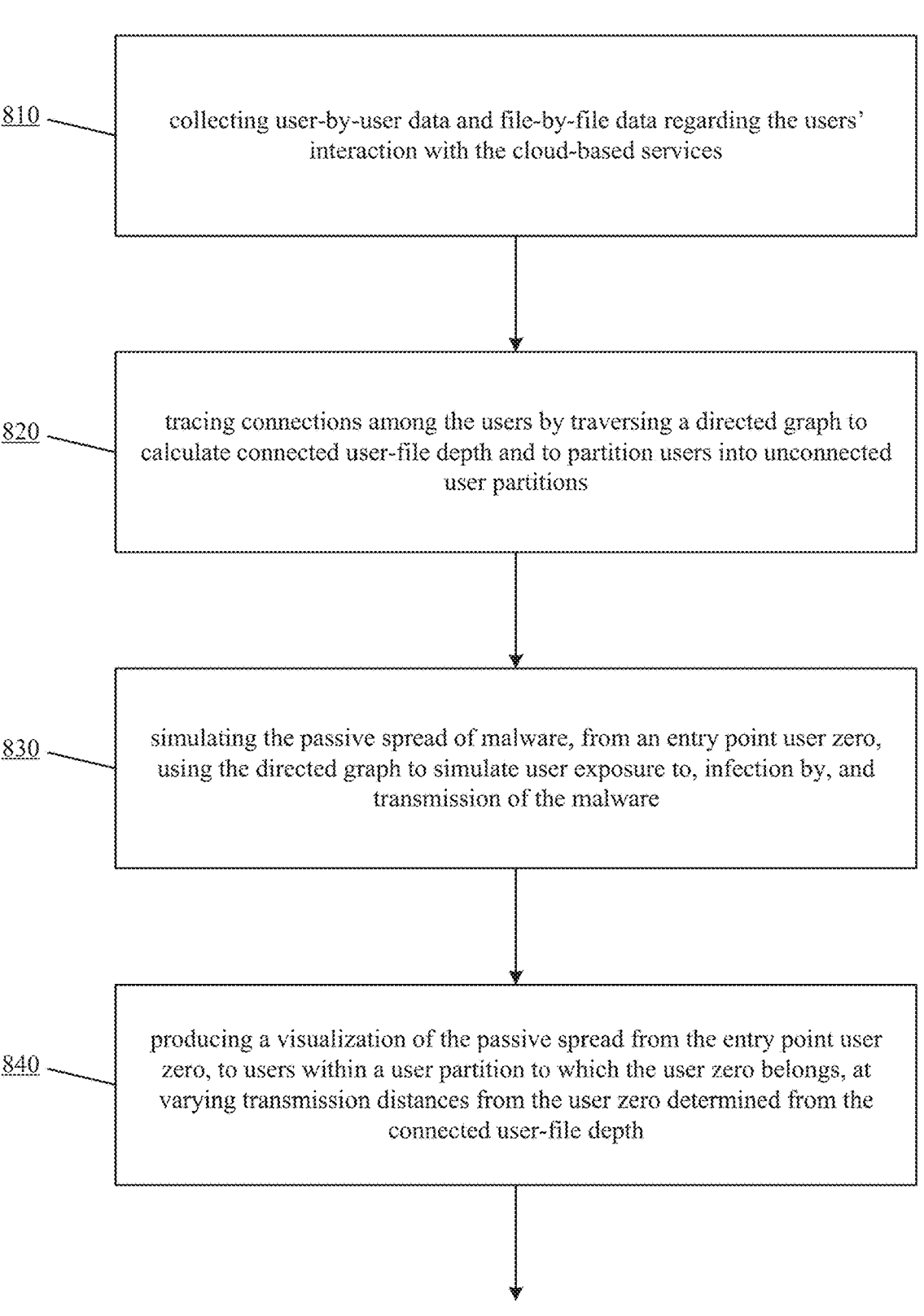

810 —— collecting user-by-user data and file-by-file data regarding the users' interaction with the cloud-based services 820 —— tracing connections among the users by traversing a directed graph to calculate connected user-file depth and to partition users into unconnected user partitions 830 —— simulating the passive spread of malware, from an entry point user zero, using the directed graph to simulate user exposure to, infection by, and transmission of the malware 840 —— producing a visualization of the passive spread from the entry point user zero, to users within a user partition to which the user zero belongs, at varying transmission distances from the user zero determined from the connected user-file depth

FIG. 8

SIMULATION AND VISUALIZATION OF MALWARE SPREAD THROUGH SHARING OF DATA OBJECTS IN CLOUD APPLICATIONS

CROSS REFERENCE TO OTHER APPLICATIONS

This application is a continuation of U.S. patent application Ser. No. 18/345,307, titled "MALWARE SPREAD SIMULATION AND VISUALIZATION FOR CLOUD SECURITY," filed Jun. 30, 2023, and issued as U.S. Pat. No. 12,041,074 on Jul. 16, 2024, which is a continuation of U.S. patent application Ser. No. 17/110,132, titled "MALWARE SPREAD SIMULATION FOR CLOUD SECURITY," filed Dec. 2, 2020, issued as U.S. Pat. No. 11,736,509 on Aug. 22, 2023, which is a continuation of U.S. patent application Ser. No. 15/911,034, titled "SIMULATION AND VISUALIZATION OF MALWARE SPREAD IN A CLOUD-BASED COLLABORATION ENVIRONMENT," filed Mar. 2, 2018, issued as U.S. Pat. No. 10,862,916 on Dec. 8, 2020, which claims priority to and the benefit of U.S. Provisional Application No. 62/480,542, titled "SIMULATION AND VISUALIZATION OF MALWARE SPREAD IN A CLOUD-BASED COLLABORATION ENVIRONMENT," filed Apr. 3, 2017, each of which are incorporated herein by reference in their entireties for all purposes.

This application incorporates by reference U.S. Provisional Patent Application No. 62/373,288, titled "SYSTEMS AND METHODS OF DETECTING AND RESPONDING TO A DATA ATTACK ON A FILE SYSTEM," filed Aug. 10, 2016;

This application incorporates by reference U.S. patent application Ser. No. 14/198,499, titled "SECURITY FOR NETWORK DELIVERED SERVICES," filed Mar. 5, 2014, issued as U.S. Pat. No. 9,398,102 on Jul. 19, 2016;

This application incorporates by reference U.S. patent application Ser. No. 14/835,640, titled "SYSTEMS AND METHODS OF MONITORING AND CONTROLLING ENTERPRISE INFORMATION STORED ON A CLOUD COMPUTING SERVICE (CCS)," filed Aug. 25, 2015, issued as U.S. Pat. No. 9,928,377 on Mar. 27, 2018; and This application incorporates by reference U.S. patent application Ser. No. 15/368,240, titled "SYSTEMS AND METHODS OF ENFORCING MULTI-PART POLICIES ON DATA-DEFICIENT TRANSACTIONS OF CLOUD COMPUTING SERVICES," filed Dec. 2, 2016, issued as U.S. Pat. No. 10,826,940 on Nov. 3, 2020.

FIELD OF THE TECHNOLOGY DISCLOSED

The technology disclosed relates to simulating and visualizing spread of malware in a cloud-based collaboration environment, and in particular, relates to simulating and visualizing spread of ransomware through an organization of users who store and collaborate on files on cloud-based services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

As the number of cloud-based services increases exponentially, there is an exponential increase in the possibility of a data attack by malware, and more specifically, by ransomware. Ransomware is a computer malware that installs on a user's local endpoint and then executes an attack on the user's local endpoint by encrypting the user's files and then demanding a ransom for the user's files to be decrypted. Ransomware propagates via electronic media and networks. Examples of media that can carry a ransomware infection are email, exploit kits, removable drives, and external network shares. Ransomware often encrypts files to ensure that the victim pays the ransom to get the decryption keys.

Users can unknowingly spread ransomware through the sync and share mechanisms provided by the cloud-based services. Passive spread of ransomware and other infections among users that rely on file sync, share, and collaboration presents an increasing risk.

Virlock is a ransomware infection that encrypts files and also infects them, thereby making it a polymorphic file infector ransomware. Any user who opens a Virlock infected file spreads the infection, causing their files to become encrypted and infected, including files synced through cloud-based services. Virlock ransomware in a cloud-based collaborative environment presents a new propagation vector that has the ability to deliver malware on the fly and substantially amplify malware fan-out effect.

An opportunity arises to prevent ransomware and other malware infection propagation. Proactive detection and implementation of appropriate response mechanisms that prevent users and organizations from being held hostage to ransomware may result.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 2 depicts different system sub-components used by the system components shown in FIG. 1.

FIGS. 3, 4, and 5 show various examples of user-by-user data and file-by-file data regarding interaction of an organization's users with one or more cloud-based services.

FIG. 8 is a representative flowchart that illustrates a method of simulation and visualization of malware spread in a cloud-based collaboration environment.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The technology disclosed simulates and analyzes spread of malware through an organization as a result of sharing files using cloud-based services. This analysis is based on actual user and file sharing characteristics collected on a user-by-user and file-by-file basis.

Not all users in an organization are connected by sharing of files through cloud-based services. Partitions of unconnected users can be constructed from data collected file-by-file through an administrative interface to cloud-based file collaboration data. The data is analyzed to create a directed graph, with read only files shared in one direction along graph edges and editable, read-write files shared over bidirectional edges. Traversing the graph reveals which users are unconnected, which means not exposed to one another, directly or through an exposure chain. Partitions divide users into mutually exclusive groups that are not exposed to one another due to sharing of files through cloud-based services.

Spread of malware from one user to the next, due to opening of infected files shared using cloud-based services, can be simulated or analyzed beginning at any entry point to the organization, any "user zero". User zero becomes infected due to the spread of malware from outside the organization or other groups when user zero opens or executes an infected file.

The risk faced by an organization can be more completely assessed by evaluating an external exposure surface, through which an infected file first reaches an organization. The hygiene of individual user endpoints and file sharing properties can be evaluated. In addition, the exposure risk to others of the individual user endpoints and shared files can be evaluated.

Risk can be illustrated in animation(s), beginning at selected entry points. User zero can be selected randomly, randomly with weighting to reflect hygiene, or systematically to make a point. Risk can be evaluated by Monte Carlo trials and summarized as an aggregation of trials. Risk can be evaluated on a partition-by-partition basis.

Figure 6:
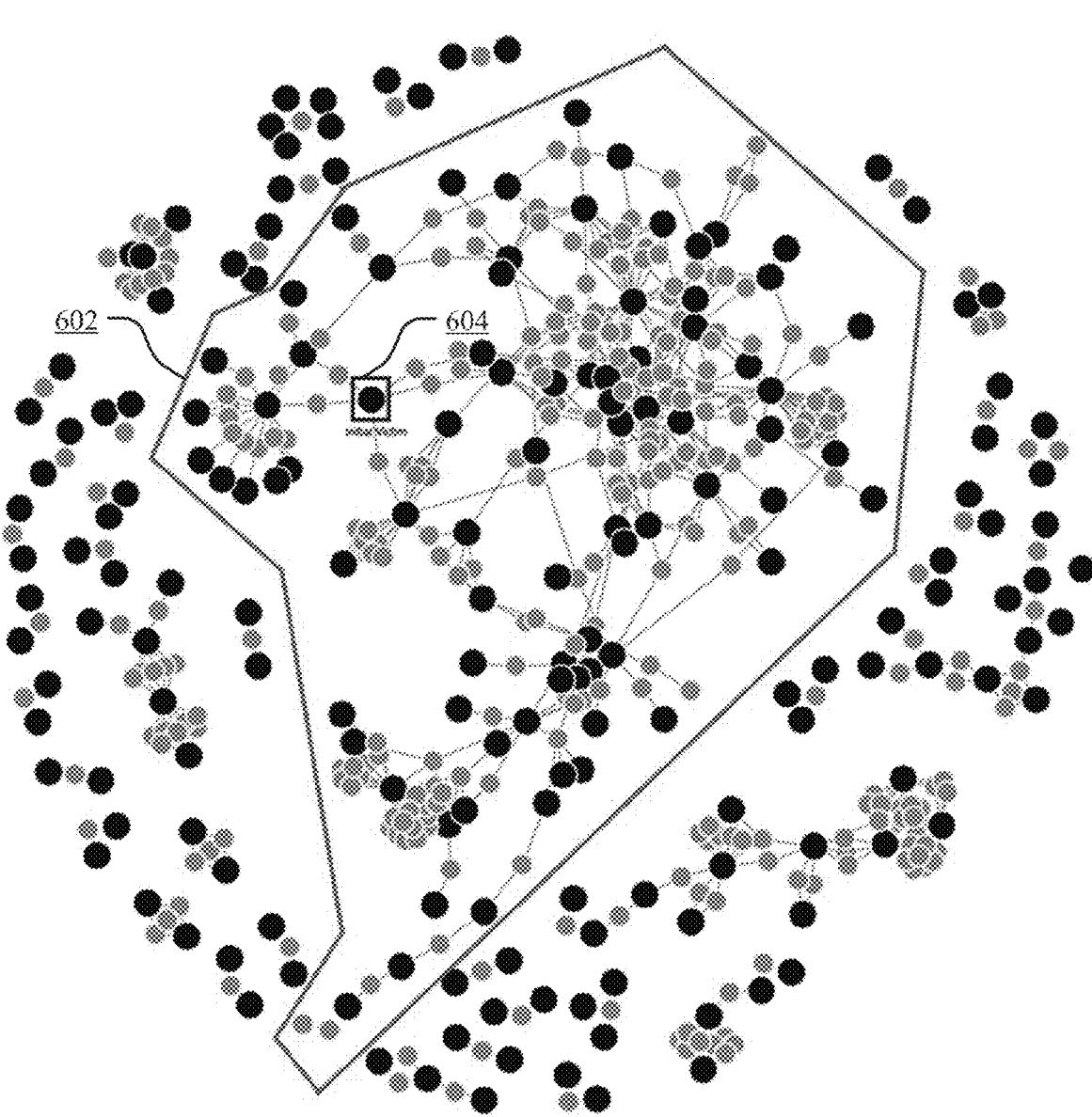
FIG. 6 is a visualization based on a directed graph constructed from the user-by-user data and the file-by-file data regarding interaction of an organization's users with one or more cloud-based services.

In addition to simulating potential future infections, the technology disclosed can be used in reaction to a detected malware infection by specifying all detected patients zero. The risk of malware infection can be identified in a user partition to which the detected patients zero belong. FIG. 6 shows a reactive simulation. In FIG. 6, user 604 is detected as a patient zero who is capable of transmitting the malware infection to other users in the user partition 602.

The technology disclosed calculates a collaborative risk index (CRI) for each user in the organization. The CRI is calculated based on multiple factors including rate of collaboration of the user, rate of share, location of the user endpoint, type of the user endpoint, and user hygiene score. A CRI score for the organization is calculated by aggregating the individual users' CRI scores. These metrics help in proactive risk analysis of threats to valuable documents, individual users and the organization as a whole.

In this application, certain concepts are claimed and explained in the context of "file objects" or "files". These concepts apply equally to "folder objects" or "folders".

System Overview

Figure 1:
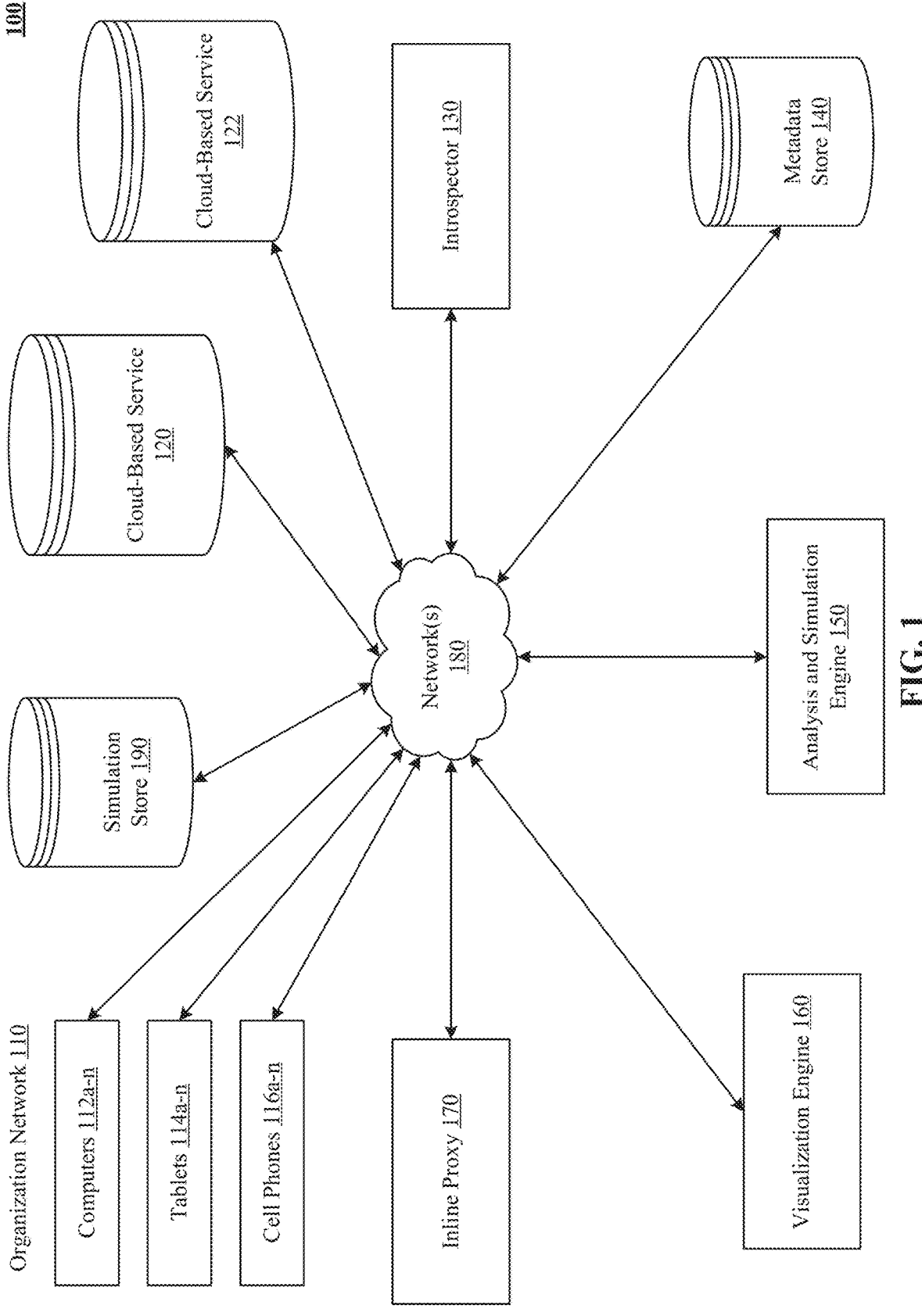
FIG. 1 shows aspects of a system that implements simulation and visualization of malware spread in a cloud-based collaboration environment.

We describe a system and various implementations for providing simulation and visualization of malware spread in a cloud-based collaboration environment. FIG. 1 shows an architectural level schematic of a system in accordance with an implementation. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes an organization network 110, a first cloud-based service 120, a second cloud-based service 122, an introspector 130, a metadata store 140, an analysis and simulation engine 150, a visualization engine 160, an inline proxy 170, and a network(s) 180. The organization network 110 comprises a variety of user endpoints such as computers 112*a-n*, tablets 114*a-n*, and cell phones 116*a-n*.

The interconnection of the elements of system 100 will now be described. The network(s) 180, couples the computers 112*a-n*, the tables 114*a-n*, the cell phones 116*a-n*, the first cloud-based service 120, the second cloud-based service 122, the introspector 130, the metadata store 140, the analysis and simulation engine 150, the visualization engine 160, and the inline proxy 170, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

In this application, a file refers to a unit of data maintained by a cloud-based service. Examples of files include documents, messages, and source code. A file has metadata obtained from file inspection that identifies attributes of the file. File metadata also identifies an audit log of user interaction with a file. Examples of user interaction include sharing a file with other users, uploading a file to a cloud-based service, and downloading a file from a cloud-based service. A file can be stored on cloud-based services using different storage schemes that encode the file into smaller or larger units. For instance, a file can be stored using block storage or object storage schemes where the file is broken into fixed-size blocks or objects for storage on cloud infrastructure. In this application, any encoding used by a cloud-based service to store, represent, or reconstruct a file is also considered a file. In this application, the term "file(s)" and "file object(s)" are used interchangeably.

The organization's users use endpoints or devices like the computers 112*a-n*, the tablets 114*a-n*, and the cell phones 116*a-n* to store and collaborate on files on cloud-based services like the first cloud-based service 120 and the second cloud-based service 122. Using the user endpoints, the organization's users interact with the cloud-based services and perform activities like file collaboration, content management, file sharing, and backup. For example, users create new files, edit already existing files, share files with other users inside or outside the organization, assign access privileges to files, and so on. Similar activities are also performed at the folder level. The users share files or folders across multiple cloud-based services. For example, a user can receive a file using a first cloud-based service such as Box™ and share the same file to one or more users using a second cloud-based service such as Salesforce.com™. The user can be member of a first group of "n" users collaborating through the first cloud-based and also a member of a second group of "m" users collaborating through the second cloud-based application at the same time. The file received by the user from a first cloud-based service (such as Box™) can spread the malware to the first group of user "n" via sync and share mechanism of the first cloud-based service. If the user collaborates on the file using the second cloud-based service (Salesforce.com™), the malware can spread to the second group of users "m".

In FIG. 1, two cloud-based services are shown, however, it is understood that system 100 can include any number of cloud-based services. Cloud-based services of system 100 can be hosted services, cloud applications, cloud stores, cloud collaboration and messaging platforms, and/or cloud customer relationship management (CRM) platforms. They can be a network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™.

Cloud-based services provide functionality to users that is implemented in the cloud and that is the target of policies, e.g., logging in, editing documents, and deleting documents, in contrast to the offerings of a simple website and ecommerce sites. Note that some consumer facing websites, e.g., Facebook™ and Yammer™, which offer social networks are the type of cloud-based services considered here. Also cloud collaboration and messaging platforms like file sharing applications such as Slack™, HipChat™, Confluence™, TeamDrive™, and Taskworld™ and cloud CRM applications like Chatter™, Zoho™, and ProsperWorks™ are the type of cloud-based services considered here. Some cloud-based services, e.g., Google's Gmail™ offer hybrid options, with some free users and other organizational users enrolled via an enterprise subscription. Note that implementations can support both web browser clients (e.g., Dropbox™ website) and application clients (e.g., Dropbox™ client). Either forms can use URL-based APIs.

An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code based specification intended to be used as an interface by software components to communicate with each other. An API can include specifications for routines, data structures, object classes, and variables. Basically, an API provides an interface for developers and programmers to access the underlying data, platform capabilities, and features of cloud-based services. Implementations of the technology disclosed use different types of APIs, including web service APIs such as HTTP or HTTPs based APIs like SOAP, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include Amazon EC2 API™, Box Content API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, and aggregated-single API like CloudRail™ API.

Inline proxy 170 is interposed between the user endpoints and the cloud-based services. It uses a combination of deep API inspection (DAPII), deep packet inspection (DPI), and log inspection to monitor cloud traffic traversing the organization network 110 to and from the cloud-based services. The inline proxy 170 evaluates the application layer traffic to discover cloud-based services interfacing with the organization network 110. It then uses DAPII to detect cloud transactions in real-time, including calls made to the cloud-based services. The cloud transactions are decomposed to identify the activity being performed and its associated parameters. In one implementation, the transactions are represented as JSON files, which identify a structure and format that allows the inline proxy 170 to both interpret what actions a user is performing in the cloud-based service as it is happening. So, for example, the inline proxy 170 can detect for an organization that "Joe from Investment Banking, currently in Japan, shared his M&A directory with an investor at a hedge fund at 10 PM".

Inline proxy 170 also includes a data loss prevention (DLP) engine that performs different content inspection techniques on files en route to and from the cloud-based services. Examples of content inspection techniques used by the inline proxy 170 include language-aware data identifier application, document fingerprinting, file type detection, keyword search, pattern matching, proximity search, regular expression lookup, exact data matching, metadata extraction, and language-agnostic double-byte character inspection.

Introspector 130 is not proxy driven, rather it interacts directly with the cloud-based services for inspecting data at rest. In a polling mode, the introspector 130 calls the cloud-based services using API connectors to crawl data resident in the cloud-based services and check for changes. As an example, Box™ storage application provides an admin API called the Box Content API™ that provides visibility into an organization's accounts for all users. The introspector 130 polls this API to discover any changes made to any of the accounts. If so, the Box Events API™ is polled to discover the detailed data changes.

In a callback model, the introspector 130 registers with the cloud-based services via API connectors to be informed of any significant events. For example, the introspector 130 can use Microsoft Office365 Webhooks API™ to learn when a file has been shared externally.

Introspector 130 also has deep API inspection (DAPII), deep packet inspection (DPI), and log inspection capabilities and includes a DLP engine that applies the different content inspection techniques on files at rest in the cloud-based services.

The result of the inspection by the inline proxy 170 and the introspector 130 is generation of user-by-user data and file-by-file data. After being generated, the user-by-user data and the file-by-file data is stored in the metadata store 140. In one implementation, the user-by-user data and the file-by-file data is stored in a semi-structured data format like JSON, BSON (Binary JSON), XML, Protobuf, Avro, or Thrift object, which comprises fields (or columns) and corresponding values of potentially different types like numbers, strings, arrays, and objects.

Metadata store 140 can be a schema-less or NoSQL store like Apache Cassandra™, Google's BigTable™, HBase™, Voldemort™, CouchDB™, MongoDB™, DocumentDB™, Redis™, Riak™, and Neo4j™. Or, it can be a SQL-based relational database like Microsoft SQL Server™, Oracle Database™, MySQL™, and IBM DB2™.

Some examples of the user-by-user data that are considered particularly meaningful in evaluating user hygiene score and user collaborative risk score can include information about an individual user such as the user's identity, the user's biographic information (e.g., title or role), an endpoint type used by the user, and the user's last login timestamp. Some examples of the file-by-file data that are considered particularly meaningful in evaluating file object hygiene score and file object collaborative risk score include information about an individual file such as user identifies of users that have access to the file (e.g., internal and external users), the nature of the access privileges of respective users (e.g., read-only privileges and write privileges), whether the file contains sensitive data, and whether the file is in a folder that is synced with external users. Other examples of the file-by-file data include a file identity, a name of the cloud-based service on which the file is stored or collaborated, the internet protocol (IP) address from where a user accessed the file, an endpoint location from where a user accessed the file, and user groups that have access to the file.

User-by-user data and file-by-file data can identify activities like creating a file, uploading a file, downloading a file, opening a file, editing a file, and sharing a file. User-by-user data and file-by-file data can be used to establish a baseline usage behavior based on criteria such as user, user groups, cloud-based service, cloud-based service categories, time of day, day of week, geolocation, bandwidth usage, and latency observed. The usage behaviors can be tracked per file and/or across folders.

A sample of the user-by-user data and the file-by-file data according to one implementation includes the following:

Cloud-based service name
Cloud-based service category
Source IP
    First 2 octets
    First 3 octets
    Full IP
    Source location
    Source country
    Source zipcode
    Source region
Destination IP
    First 2 octets
    First 3 octets
    Full IP
    Destination location
    Destination country
    Destination zipcode
    Destination region
    Destination host
User agent
Browser version
Operating System (OS) (e.g., Windows™, Android™, iOS™, Linux™)
Device Type (e.g., iPhone 6S™, Samsung Galaxy S5™, Nokia Lumia™)
Hour-of-Day
Part-of-Day
Day-of-Week
Type of activity (e.g., activity "File Upload")
Object acted on (e.g., activity "Secrets.doc")
Sensitivity level (e.g., sensitivity "High" based on designation of confidential file assets by the tenant)
Degree of sharing (e.g., share-count: 3 based on number of external parties with whom the file is shared (3))
User endpoint location
User endpoint vulnerability characteristics
User file sharing information
Identities of users sharing the file objects FIGS. 3, 4, and 5 show various examples of user-by-user data and file-by-file data regarding interaction of an organization's users with one or more cloud-based services. In FIG. 3, example entry 302 identifies a file object using a file object identifier ("id"), example entry 304 identifies Dropbox™ as the cloud-based service on which the file object is stored, example entry 306 identifies a user identifier ("User Id") of a user who interacted with the file object, example entry 308 identifies Rama Rao as the name of the user ("User Name"), example entry 310 identifies an IP addressed associated with a user endpoint used by the user to interact with the file object ("urip"), example entry 312 identifies a .txt file type of the file object ("oid"), example entry 314 identifies the activity performed by the user as share ("act"), example entry 316 identifies an iOS operating system running on the user endpoint ("os"), and example entry 318 identifies a source location of the user endpoint ("slc"). As shown in FIG. 3, the user-by-user data and the file-by-file data can include additional entries as well.

In FIG. 4, log 402 contains user-by-user data and file-by-file data that identify user file sharing behavior. For example, the log 402 identifies a file object ("id"), a cloud-based service on which the file object resides ("appname"), a username of a user who interacted with the file object ("ghostking"), whether the user is an admin ("isAdmin"), when the user last logged in ("lastLoginTime"), and a user identifier of the user ("uid"). As shown in the log 404, the user-by-user data and the file-by-file data can identify additional user file sharing behavior. In some implementations, logs 402 and 404 identify user file sharing behavior of two users respectively.

In FIG. 5, logs 502, 504, 506, 508, and 510 contain user-by-user data and file-by-file data that identify different key-value pairs representing various user and file characteristics. In some implementations, logs 502, 504, 506, 508, and 510 apply to five file objects respectively. The following sample includes some example key-value pairs identified by the user-by-user data and the file-by-file data:

| Key | Value for Log 502 (e.g., first file object) | Value for Log 506 (e.g., third file object) |
| --- | --- | --- |
| File identifier ("_id") | 74114882302 | 11137246890 |
| Shared Type ("sharedType") | private | external |
| User Identifier ("user") | gbansal@netskope.com | admin@nammazone.com |
| Domain Name ("domain_shared_with") | acme.com | gmail.com |
| Type ("fileType") | document | folder |
| Collaboration Status ("collaborated") | not collaborated | collaborated |
| Ownership Status ("ownership") | internally owned | externally owned |

In addition to periodically generating the user-by-user data and the file-by-file data and persisting it in the metadata store 140, the inline proxy 170 and the introspector 130 also enforce security policies on the cloud traffic. The inline proxy 170 and the introspector 130 further include a security engine that triggers various security actions based on the results of the DLP inspection. Examples of security actions include quarantining high value file objects, encrypting high value file objects, and quarantining high value users. For further information regarding the functionality of the inline proxy 170 and the introspector 130, reference can be made to, for example, commonly owned U.S. patent application Ser. Nos. 14/198,499; 14/198,508; 14/835,640; 14/835,632; and 62/307,305; Cheng, Ithal, Narayanaswamy, and Malmskog. *Cloud Security For Dummies, Netskope Special Edition*. John Wiley & Sons, Inc. 2015; *"Netskope Introspection"* by Netskope, Inc.; "Data Loss Prevention and Monitoring in the Cloud" by Netskope, Inc.; *"Cloud Data Loss Prevention Reference Architecture"* by Netskope, Inc.; *"The 5 Steps to Cloud Confidence"* by Netskope, Inc.; *"The Netskope Reactive Platform"* by Netskope, Inc.; *"The Netskope Advantage: Three "Must-Have" Requirements for Cloud Access Security Brokers"* by Netskope, Inc.; *"The 15 Critical CASB Use Cases"* by Netskope, Inc.; *"Netskope Reactive Cloud DLP"* by Netskope, Inc.; *"Repave the Cloud-Data Breach Collision Course"* by Netskope, Inc.; and *"Netskope Cloud Confidence Index™"* by Netskope, Inc., which are incorporated by reference for all purposes as if fully set forth herein.

The analysis and simulation engine 150 evaluates the user-by-user data and the file-by-file data stored in the metadata store 140 and constructs a directed graph. The directed graph has nodes that represent an organization's users and has edges between the nodes that represent file-based connections between the users. For example, the directed graph identifies a first user, i.e., a first node, connected via an edge to a second user, i.e., a second node, if the first and second users share a file through a cloud-based service. Other examples of file-based connections include users sharing a folder with other users, users transmitting a file to other users, and users transmitting a folder to other users.

Additionally, the analysis and simulation engine 150 traces connections among the users by traversing the directed graph to calculate connected user-file depth and to partition users in the organization into unconnected user partitions. The users in one partition are either directly connected to each other through a shared file or indirectly connected by a chain of edges.

Overall, the directed graph identifies how the organization's users are collaborating with others users on various cloud-based services; providing the organization with an evaluation of its so-called "cloud collaborativeness" on a single pane of glass.

In some implementations, the directed graph includes only users internal to an organization. In other implementations, it also includes external users. In some implementations, the directed graph only includes file objects that are internally owned by an organization. In other implementations, it also includes file objects that are externally owned.

The analysis and simulation engine 150 identifies an entry point user zero in the organization network 110 that has been infected by a malware. Malware refers to a machine-propagated or human-propagated malicious activity or infection that harms an organization's network resources and infrastructure such as files, computers, servers, and databases. Examples of a malware include adware, spyware, virus, worm, trojan, rootkit, backdoor, keylogger, rouge security software, ransomware, and browser hijacker. Passive malware that holds files for ransom is activated by executing an infected file. Passive spread also extends to reading files that have embedded scripts or macros, such as PDF or DOCM files, using viewers that execute the embedded code. In particular, implementations of the technology disclosed simulate and visualize spread of ransomware in a cloud-based collaboration environment.

The entry point user zero is identified based on determining that a malicious activity is in process in the directed graph. In one implementation, such a determination is made by accessing the metadata store 140 and analyzing current file-by-file data of file objects and historical file-by-file data of the file objects to identify a pattern of changes from the historical data to the current data that exceeds a predetermined change velocity. For further information regarding detecting a data attack like malware and ransomware that creates the entry point user zero in the organization network 110, reference can be made to commonly owned U.S. Patent Application No. 62/373,288.

After one or more entry point users zero are identified, the analysis and simulation engine 150 traces connections among the users by traversing the directed graph to simulate the spread of malware from the entry point users zero through the organization network 110. In implementations, the simulation is based on epidemiological models like Kermack and McKendrick compartmental models including SIR (susceptible, infected, removed) model, SAIR (susceptible, antidote, infected, removed) model, SAIC (suscep-tible, antidote, infected, contaminated) model, SI (suscep-tible, infected) model, SIS (susceptible, infected, susceptible) model, SAI (susceptible, antidote, infected) model, SLBS (susceptible, latent, breaking, susceptible) model, and SLBRS (susceptible, latent, breaking, recovered, susceptible) model.

The analysis and simulation engine 150 simulates both proactive and reactive malware spread. In proactive mal-ware spread simulation, the analysis and simulation engine 150 identifies how a potential malware can propagate through the directed graph or a portion of the directed graph (e.g., a user partition or a section of a user partition) and can impact the organization network 110 given certain entry point users zero (i.e., identifying which users and files are susceptible to infection by the malware).

In one implementation of the proactive malware spread simulation, the entry point users zero are already infected users that have not yet transmitted the malware to other users or have transmitted the malware only to a limited number of other users. In another implementation of the proactive malware spread simulation, the entry point users zero are selected from a pool of uninfected users that are most likely candidates for malware infection based on the user-by-user data and the file-by-file data. In yet another implementation, the entry point users zero are selected randomly from a pool of uninfected users. In yet further implementation, the entry point users zero are selected from a pool of high value users or users that have file-based connections with high value file objects.

In reactive malware spread simulation, the analysis and simulation engine 150 identifies how a malware, starting from certain entry point users zero, has already propagated through the directed graph or a portion of the directed graph (e.g., a user partition or a section of a user partition) and impacted the organization network 110 (i.e., identifying which users and files have been infected by the malware). The identification is stratified into classes such as users and files that have been exposed to the malware but have not been yet infected by the malware, users and files that have been infected by the malware but have not yet transmitted the malware to other users and files, and users and files that have transmitted the malware to other users and files.

In implementations, the analysis and simulation engine 150 stores the directed graph and the analysis and simulation of malware spread through the directed graph as simulation data in a simulation store 190.

The visualization engine 160 accesses the simulation store 190 and uses the simulation data to produce a visualization of the spread from the entry point users zero, to users within a user partition to which the user zeros belong, at varying transmission distances from the users zero. The varying transmission distances are determined from the connected user-file depth.

FIG. 2 depicts different system sub-components 200 used by the system components shown in FIG. 1. Some imple-mentations may have different and/or additional modules than those shown in FIG. 2. Moreover, the functionalities can be distributed among the modules and across the hard-ware platforms in a different manner than described herein.

The introspector 130 comprises an administrative inte-grator 211, a query builder 213, and a metadata organizer 215. Administrative integrator 211 has specific connectors for different cloud-based services that allow the introspector 130 to inspect data at rest in the cloud-based services. For example, in FIG. 2, API connector 1 can be for Box™ and API connector 2 can be for Dropbox™. In other implementations, the administrative integrator 211 includes a so-called "universal connector" that serves as a single interface to multiple cloud-based services, and in particular to unsanc-tioned cloud-based services. In implementations, the admin-istrative integrator 211 uses secure protocols like OAuth to access the cloud-based services.

The query builder 213 is used to create custom queries that instruct the administrative integrator 211 to collect specific user-by-user data and specific file-by-file data from different cloud-based services. The customization can be based on respective metrics used in the simulation.

The metadata organizer 215 maps the user-by-user data and the file-by-file data from multiple cloud-based services into profiles that are stored in the metadata store 140. Examples of profiles include user profiles, file object pro-files, partition profiles, organization group profiles, and organization profiles. Prior to profiling, in some implemen-tations, the user-by-user data and the file-by-file data is subjected to pre-processing such as deduplication and entity resolution.

The analysis and simulation engine 150 comprises a graph builder 231, a graph traverser 233, a metrics calculator 235, an infection propagator 237, an iterator 239. The graph builder 231 uses the user-by-user data and the file-by-file data to build a graph that connects the users through shared file objects. In the graph, the users are represented as nodes and the shared file objects are represented as edges. In one implementation, the connections are represented by a directed cyclic graph and the nodes are connected by directed edges. If two users share a file object on a cloud-based service and both have a write privilege on the file object, they are connected by a bidirectional edge. In this case, both users are equally at risk of spreading the malware through the shared file object because the shared file object gets synced to the cloud-based service from endpoints of both the users. Thus, irrespective of at which user's endpoint the shared file object gets infected, the infection is trans-mitted to the cloud-based service and in turn to the endpoint of the other user.

If a first user shares a file object with a second user on a cloud-based service by giving read-only privilege to the second user, then the first and second users are connected by a unidirectional edge, with the edge pointing towards the second user. In this case, the second user is susceptible to malware infection by the first user as a result of receiving and/or opening the shared file object that is infected and synced to the cloud-based service from an endpoint of the first user. In contrast, the first user is not susceptible to malware infection by the second user because the shared file object does not get synced to the cloud-based service from an endpoint of the second user. Thus, even if a local instance of the shared file object is infected at the second user's endpoint, the infection is not transmitted to the cloud-based service and in turn not transmitted to the first user's end-point.

Additionally, the graph builder 231 uses the user-by-user and the file-by-file data to calculate connected user-file depth, which identifies all or some of the user-file connec-tions in the organization, including the longest user-file connection. In one implementation, when the connected user-file depth represents the longest user-file connection in the organization, it is inserted to determine an amount of time it will take for the malware spread to completely propagate through the directed graph and thus infect every user and file object in the organization network 110.

The graph traverser 233 traverses the graph built by the graph builder 231. Graph traversal or graph search refers to the process of visiting each node in the graph. Unlike tree traversals, graph traversals may require visiting some nodes more than once because it is not necessarily known before traversing a node that it has already been explored. As graphs become more dense, this redundancy becomes more prevalent causing computation time to increase. The complexity of graph traversal further increases for directed cyclic graphs because of the presence of cycles. To reduce the complexity, in some implementations, the graph traverser 233 converts the directed cyclic graph generated by the graph builder 231 to an undirected graph.

The graph traverser 233 also identifies groups of user endpoints in unconnected partitions of the graph. In some implementations, users in a first partition of the graph are not at risk of getting infected by malware from file objects shared by users in a second partition. Some examples of graph traversal algorithms used by the graph traverser 233 include breadth-first search (BFS) algorithm, depth-first search (DFS) algorithm, random walk algorithm, anti-random walk algorithm, recursive greedy algorithm, topological sort algorithm, and strongly connected components algorithm. In another implementation, Markov chain algorithm is used by the graph traverser 233 for graph traversal.

The metrics calculator 235 calculates collaborative risk scores (CRSs) or collaborative risk indexes (CRIs) and hygiene scores at varying levels of granularity in the organization network 110. The CRS value for an individual user is a weighted combination of a user rate of collaboration of the user, a hygiene score of a location of a user endpoint of the user, and vulnerability characteristics of the user endpoint, and a hygiene score of the user. The user rate of collaboration depends on the number of shared files a user is working on. The collaboration rate further depends on the access privileges applicable to the shared files. If the user has write privileges over a shared file object, it increases the risk of malware spread as compared to read-only privileges. A hygiene score is assigned to the location based on historical data. For example if the user is in a location from where malware infected documents have regularly originated, such a location is given a low hygiene score. The vulnerability characteristics of the user endpoint are determined by the operating system and applications and services running on the user endpoint. For example, if the endpoint does not have the most recent version of the operating system, the endpoint is assigned a low hygiene score. The user hygiene score is calculated based on historical data such as previous malware detections and results from user-level security evaluations.

A file object hygiene score is calculated based on the sharing information about the file object. For example, if the file object is shared internally, it is assigned a high hygiene score. If the file object is shared externally, it is assigned a low hygiene score. The degree to which a file is shared internally or externally also impacts the file object hygiene score. The file object hygiene can be further refined based on analysis of file object write privileges and sharing amongst internal or external groups.

The metrics calculator 235 also calculates a CRS score for a partition (a group of connected users) by aggregating the individual CRS scores for the users in the partition. An organization CRS is calculated by aggregating the scores of all users and/or user partitions in the organization.

The metrics calculator 235 calculates an external surface exposure value for a file object based on the identities of the external users sharing the file object. The external users do not belong to the organization but they are given access to a shared file object by a user belonging to the organization.

The access privilege can be a file object write privilege or a read-only privilege. The metrics calculator 235 aggregates the external surface exposure for all file objects shared to external users to determine external surface exposure for the organization. An external surface exposure score for a folder object is also calculated if the folder object is shared with the external user. The folder object contains one or more file objects. In this application, certain concepts are claimed and explained in the context of "file objects" or "files". These concepts apply equally to "folder objects" or "folders".

It is understood that a variety of scoring schemes can be used to represent the various hygiene scores, CRSs, and external surface exposure scores described above. For example, a hygiene score can be represented by using discrete values or a Likert scale.

The infection propagator 237 uses the uses the user-by-user and the file-by-file data, the different metrics, and the directed graph to identify the impact of malware spread through the organization's network 110. It is applied in both a proactive and a reactive scenario. In the proactive scenario, the infection propagator 237 is used to perform a what-if analysis. Malware impact analysis visualization is generated by initiating malware spread from one or more user endpoints. The user endpoint initiating the malware spread is also referred to as a patient zero. The proactive analysis can be performed by selectively choosing user endpoints as patient zero based on a pre-defined criteria, or systematically choosing all user endpoints. In a reactive scenario, the infection propagation is used to generate the impact analysis by initiating malware spread through the organization's network 110 from one or more user endpoints that are actually infected by a malware. This allows the organization to perform preventive measures to protect valuable documents and valuable users before they are impacted. An example infection propagation analysis is shown in FIGS. 7A through 7F.

A probability distribution of events can be used to generate the simulation of malware spread through the organization's network 110. An example of the event is a user opening a shared file. A number of probability distributions are available for simulation purposes such as normal, log-normal, uniform, and triangular. Each user in the organization can also be assigned a discrete value for an event based on the historical data. For example, a first user can have 20% chance of opening a shared file object and a second user can have 80% chance of opening a shared file object. These values can be further refined based on other factors. For example, if two users work on the same project, there is a high probability of them opening a shared file object.

The analysis and simulation engine 150 executes the infection propagation simulation using a simulation model. An example simulation model is the Monte Carlo simulation model. Monte Carlo simulation provides the decision maker with a range of possible outcomes and the probabilities of their occurrence. During Monte Carlo simulation, values are sampled at random from the input probability distributions. Each set of samples is called an iteration and the resulting outcome from that sample is recorded. Monte Carlo simulation does this for hundreds and thousands of times and the result is a probability distribution of possible outcomes. In this way, the decision maker has a more comprehensive view of what may happen because the results not only show what may happen but how likely it is to happen. The iterator 239 generates these results for the organization's decision maker using the selected probability distribution for inputs and the simulation model.

The visualization engine 160 contains a graph database 251 containing a multiplicity of graph layouts 253. A layout of a graph is a pictorial representation of the nodes and the edges of the graph. A graph can be represented by multiple graph layouts. The arrangement of the vertices and the edges with the graph layout affects its understandability and usability. Some examples of graph layouts 253 include Kamada-Kawai, Fruchterman-Reingold, Reingold-Tilford, GEM, and Tunkelang. Modifications of the existing graphs layouts can also be used to represent the visualization of the spread of malware across the organization's network 110.

Visualization

FIG. 6 is a visualization based on a directed graph constructed from the user-by-user data and the file-by-file data regarding interaction of an organization's users with one or more cloud-based services. A black circle on the graphic visualization 600 represents a user and a blue circle represents a file object. The users are connected to each other through shared files, which are represented by the edges. A boundary 602 encloses a connected partition of the users. An entry point user zero 604 is also shown.

Figure 7A:
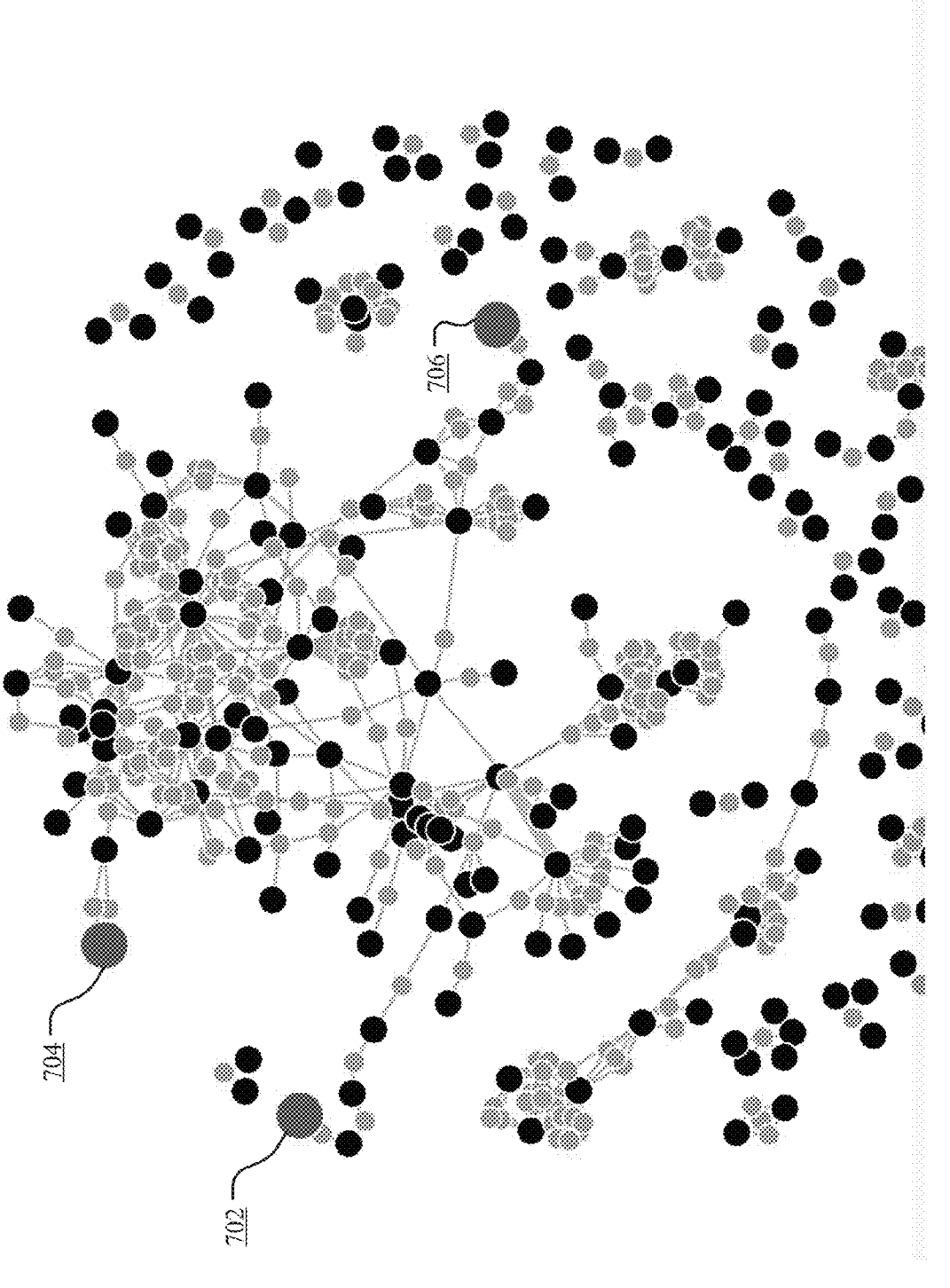
FIGS. 7A, 7B, 7C, 7D, 7E, and 7F are an example time-lapsed visualization of malware spread simulation through an organization of users who store files on one or more cloud-based services.
Figure 7B:
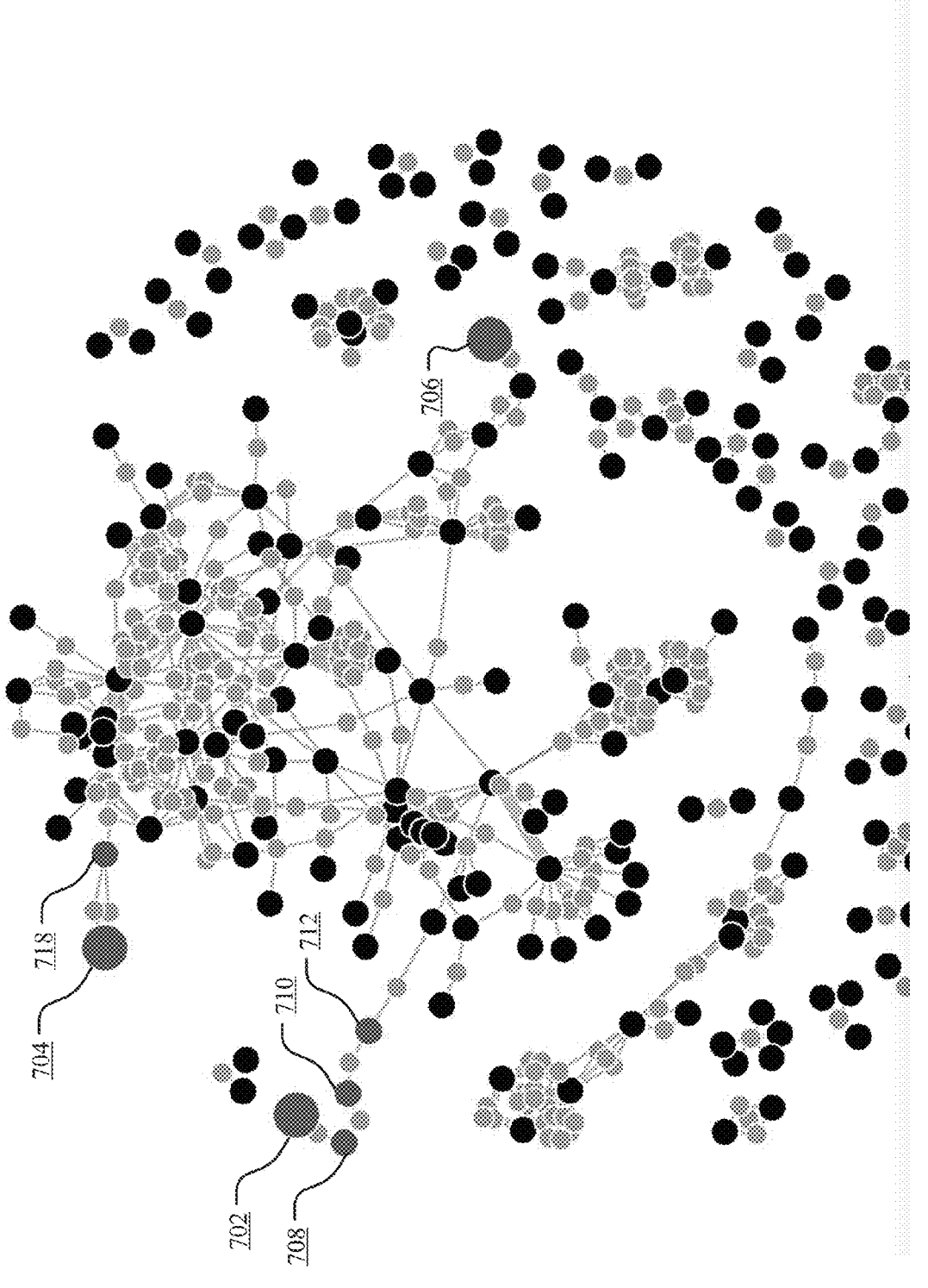

FIGS. 7A, 7B, 7C, 7D, 7E, and 7F are an example time-lapsed visualization of the malware spread simulation through an organization of users who store files on one or more cloud-based storage services. FIG. 7A shows three users 702, 704, and 706 with user endpoints infected with a malware. FIG. 7B shows the spread of malware to a user 708 through a file shared with the user 702. Likewise, FIG. 7B shows spread of the malware to a user 710 who is sharing a file with the user 708. This process continues to infect the user 712. A user 718 gets malware from user 704.

Figure 7C:
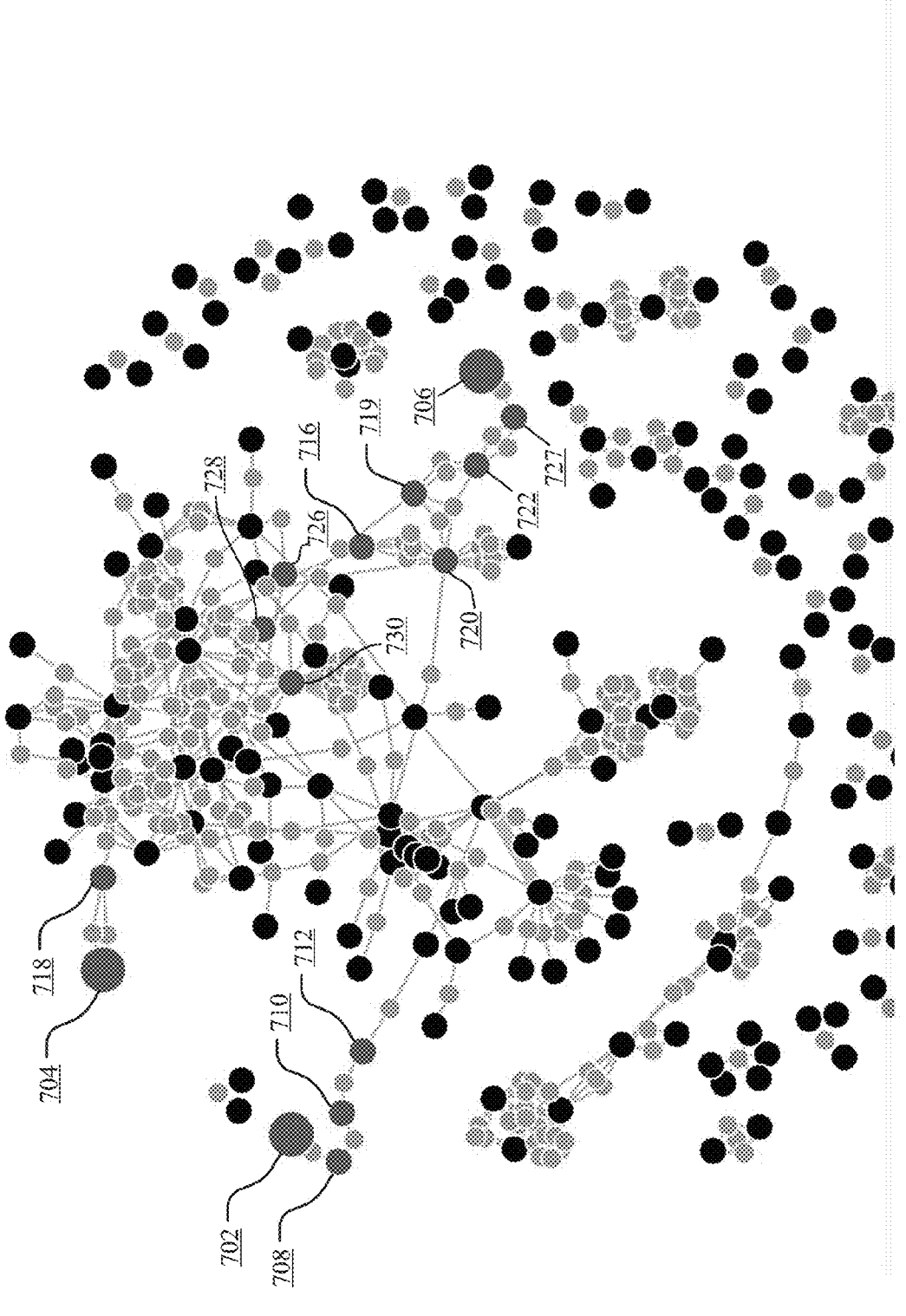
Figure 7D:
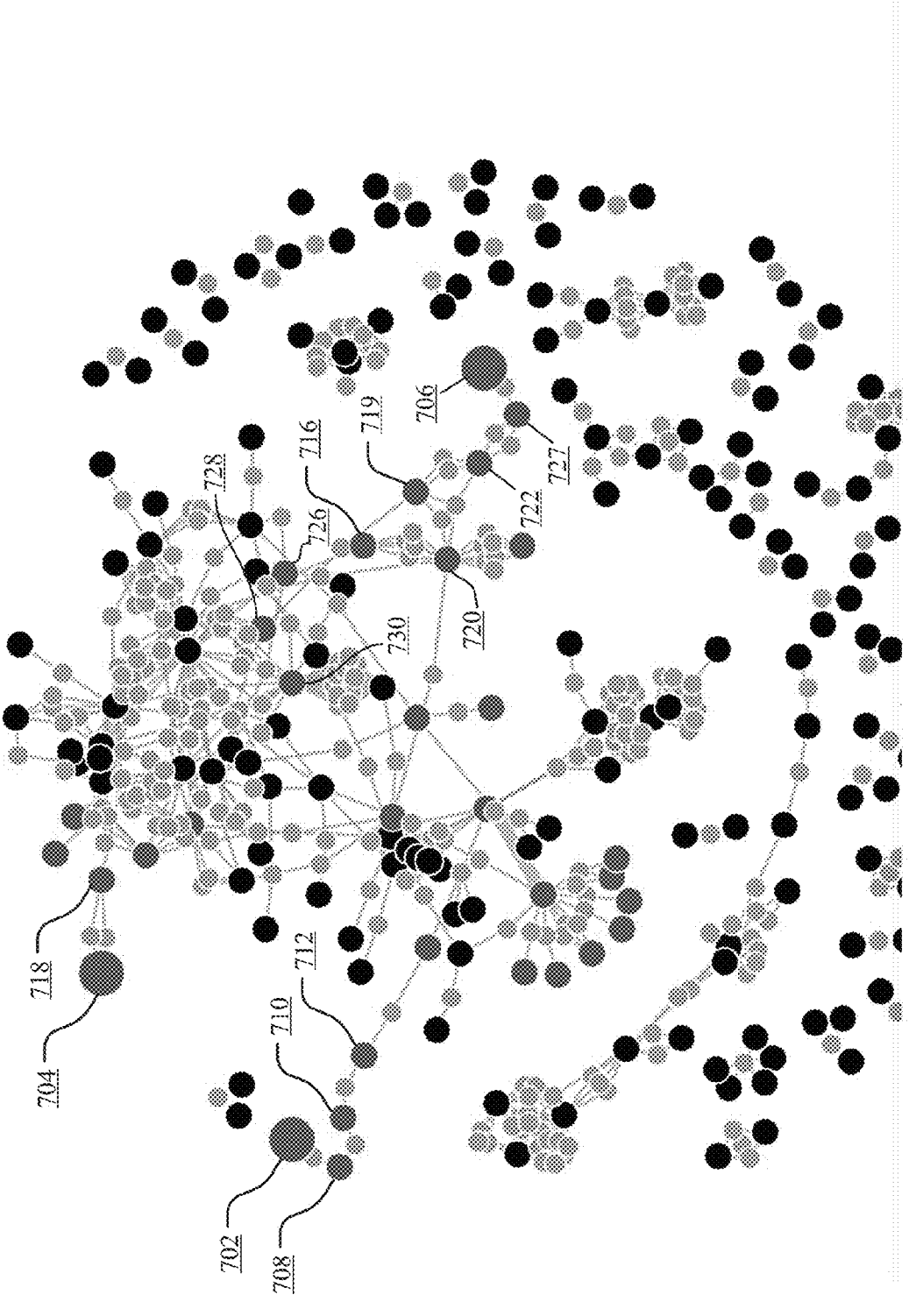
Figure 7E:
Figure 7F:
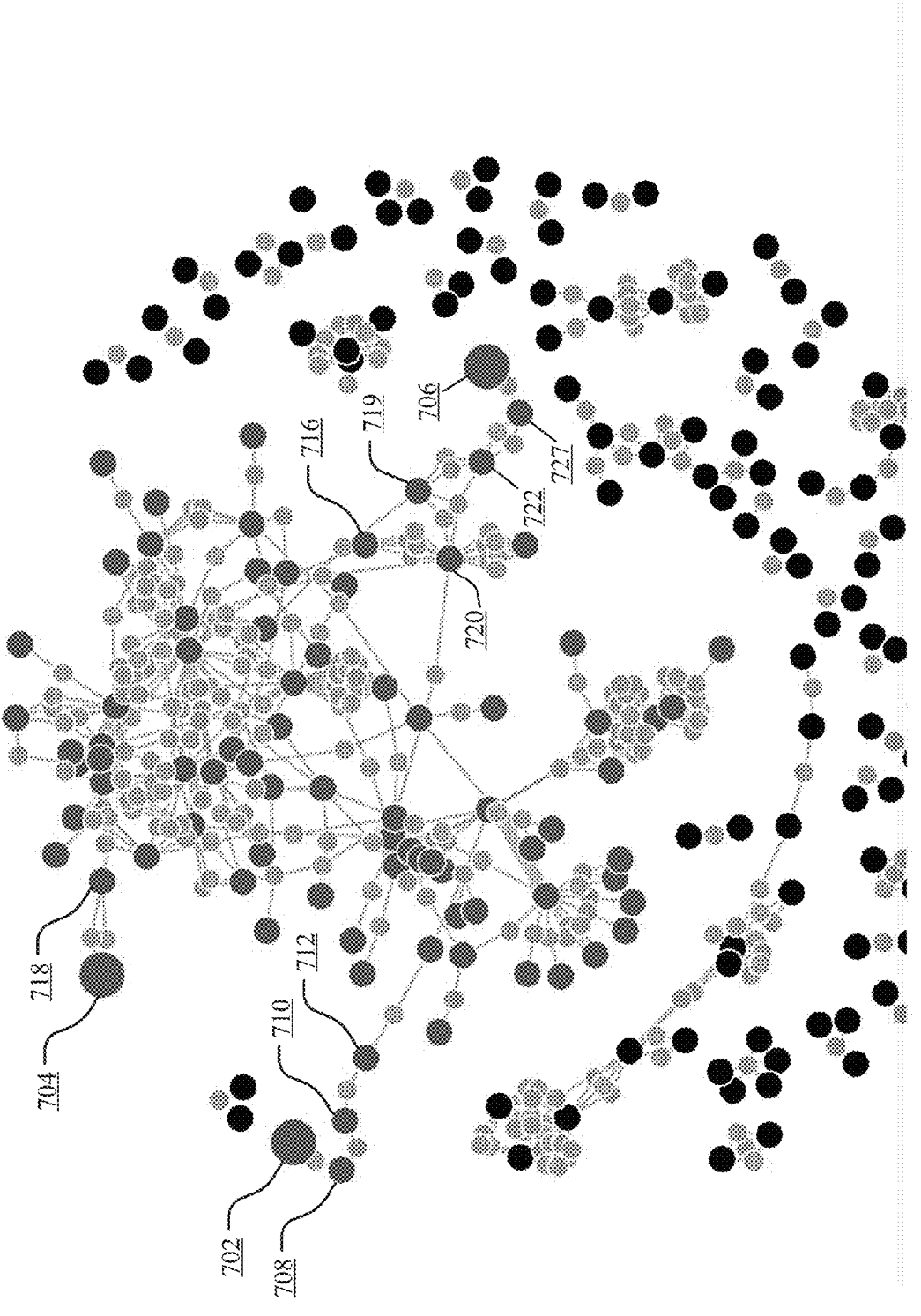

FIG. 7C shows further spread of the malware across the organizations network 110 impacting users 716, 719, 720, 722, 727, 726, 728, and 730. In FIG. 7D, the malware further propagates to new users as shown by more red colored nodes. FIGS. 7E and 7F show further progression of the malware resulting in impacting all the users in a connected partition, as graphically depicted by red colored nodes in FIG. 7F.

Process

FIG. 8 is a representative flowchart 800 that illustrates a method of simulation and visualization of malware spread in a cloud-based collaboration environment. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

At action 810, user-by-user data and file-by-file data regarding the users' interaction with the cloud-based services is collected. For individual users, the user-by-user data includes user endpoint location, user endpoint vulnerability characteristics, and user file sharing information. For individual file objects, the file-by-file data includes identities of users sharing the file objects and user access privilege information. In some implementations, the user-by-user data and file-by-file data is collected via a cross-application introspector with one or more API connectors to the cloud-based services. In other implementations, the user-by-user data and file-by-file data is collected via a cross-application proxy, interposed between user endpoints and the cloud-based services, which inspects the users' interaction with the cloud-based services in real-time.

At action 820, connections among the users in the organization are traced by traversing a directed graph constructed from the user-by-user data and the file-by-file data. Based on the directed graph, a connected user-file depth is calculated. The directed graph is also used to partition users in the organization into unconnected user partitions.

At action 830, the directed graph is used to simulate the spread of malware. The simulation simulates the malware spread from an entry point user zero through the organization, via the cloud-based services. The simulation simulates user exposure to, infection by, and transmission of the malware within the organization.

At action 840, a visualization of the malware spread is produced. The visualization graphically depicts the malware spread from the entry point user zero, to users within a user partition to which the user zero belongs, at varying transmission distances from the user zero. The varying transmission distances are determined from the connected user-file depth.

Computer System

Figure 9:
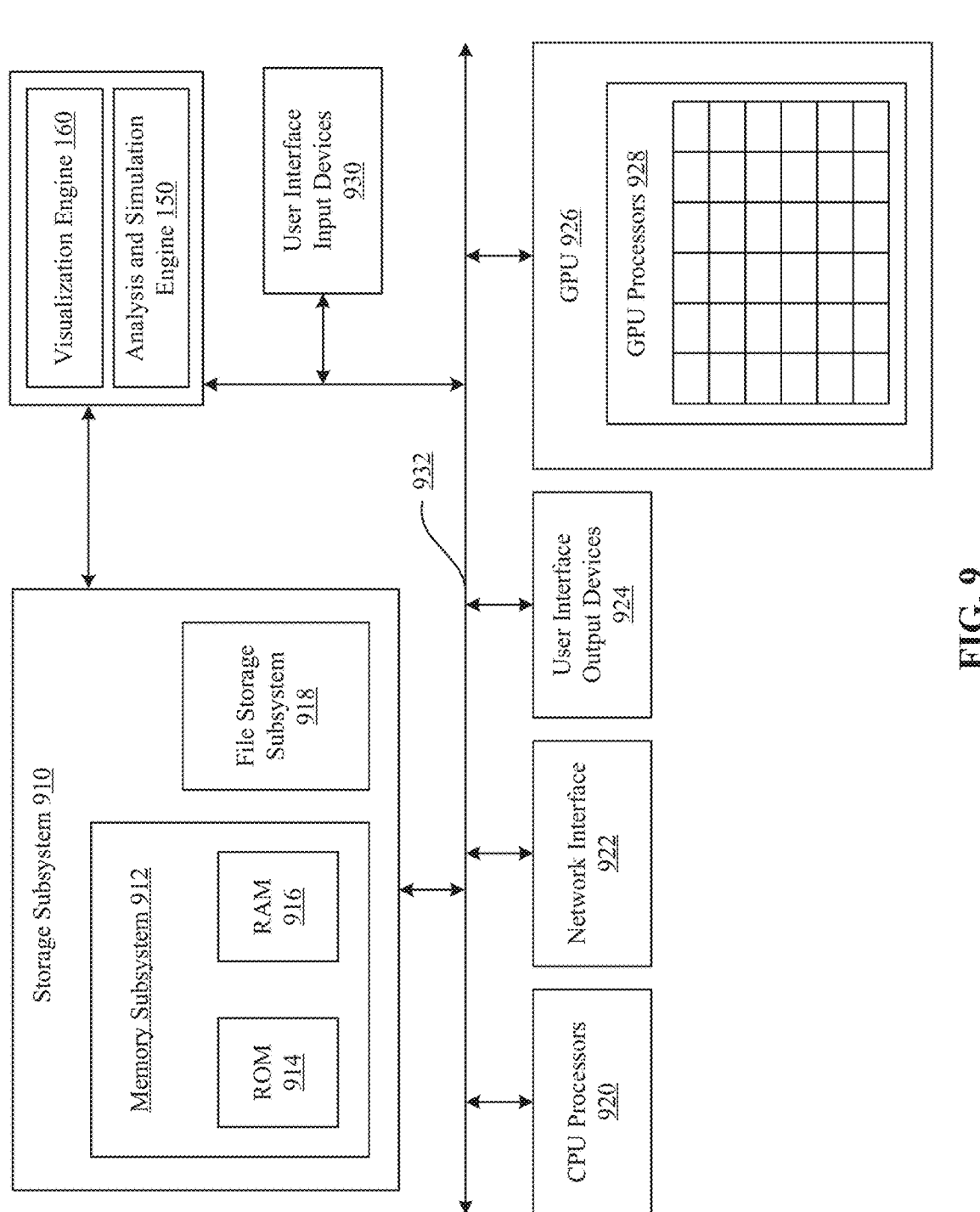
FIG. 9 is a simplified block diagram of a computer system that can be used to implement the technology disclosed.

FIG. 9 is a simplified block diagram of a computer system that can be used to implement the technology disclosed. Computer system 900 typically includes one or more CPU processors 920 that communicate with a number of peripheral devices via bus subsystem 932. These peripheral devices can include a memory subsystem 912 including, for example, memory devices and a file storage subsystem 918, user interface input devices 930, user interface output devices 924, a network interface subsystem 922, and a GPU 926 with multiple GPU processing cores or GPU processors 928. The input and output devices allow user interaction with computer system 900. Network interface subsystem 922 provides an interface to outside networks, including an interface to corresponding interface devices in other computer systems.

The visualization engine 160 and the analysis and simulation engine 150 are connected to the storage subsystem 910 and the GPU 926.

User interface input devices 930 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 924 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. These software modules are generally executed by CPU processors 920 alone or in combination with other processors like GPU processors 928.

Memory subsystem 912 in the storage subsystem can include a number of memories including a main random access memory (RAM) 916 for storage of instructions and data during program execution and a read only memory (ROM) 914 in which fixed instructions are stored. A file storage subsystem 918 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 918 or the memory subsystem 912, or in other machines accessible by the processor.

Bus subsystem 932 provides a mechanism for letting the various components and subsystems of computer system 900 communicate with each other as intended. Although bus subsystem 932 is shown schematically as a single bus, alternative implementations of the bus subsystem can use multiple busses. In some implementations, an application server (not shown) can be a framework that allows the applications of computer system 900 to run, such as the hardware and/or software, e.g., the operating system.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

Particular Implementations

We describe various implementations of simulating and visualizing spread of malware in a cloud-based collaboration environment. In this application, certain implementations are claimed and explained in the context of "file objects" or "files". These concepts apply equally to "folder objects" or "folders".

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions to analyze or simulate spread of malware through an organization of users who store and collaborate on files on one or more cloud-based services. First, user-by-user data and file-by-file data regarding the users' interaction with the cloud-based services is collected. For individual users, the user-by-user data includes user endpoint location, user endpoint vulnerability characteristics, and user file sharing information. For individual file objects, the file-by-file data includes identities of users sharing the file objects and user access privilege information.

The user-by-user data and file-by-file data is collected via a cross-application introspector with one or more API connectors to the cloud-based services. In other implementations, the user-by-user data and file-by-file data is collected via a cross-application proxy, interposed between user endpoints and the cloud-based services, which inspects the users' interaction with the cloud-based services in real-time.

Following this, connections among the users in the organization are traced by traversing a directed graph constructed from the user-by-user data and the file-by-file data. Based on the directed graph, a connected user-file depth is calculated. The directed graph is also used to partition users in the organization into unconnected user partitions.

The directed graph is used to simulate the spread of malware. The simulation simulates the malware spread from an entry point user zero through the organization, via the cloud-based services. The simulation simulates user exposure to, infection by, and transmission of the malware within the organization.

A visualization of the malware spread is produced. The visualization graphically depicts the malware spread from the entry point user zero, to users within a user partition to which the user zero belongs, at varying transmission distances from the user zero. The varying transmission distances are determined from the connected user-file depth.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The user file sharing information can be used by the system to calculate user rate of sharing files through the cloud-based services and user rate of opening files shared through the cloud-based services. Based on this, for individual users, a user rate of collaboration is calculated. The user rate of collaboration can be in turn used for simulating the spread of malware.

The number of users with write access privileges to the file object and the number of users with read access privileges to the file object can be determined using the identities of the users sharing the file object and the user access privilege information. Based on this, for individual file objects, a file object collaboration depth is calculated. The file object collaboration depth can be in turn used for simulating the spread of malware.

The identities of users sharing the file objects and the user access privilege information can be used to determine number of users in the organization having access to a file object, number of users outside the organization having access to the file object, and whether the file object is shared within an organizational group. Based on this, for individual file objects, a hygiene score is calculated. The hygiene score can be in turn used for simulating the spread of malware.

A user collaborative risk score can be calculated for individual users based on the user endpoint location of a user, the user endpoint vulnerability characteristics of the user, the user rate of collaboration of the user, the file object collaboration depth of file objects connected to the user, and the hygiene score of file objects connected to the user. The user collaborative risk score can be in turn used for simulating the spread of malware.

For individual file objects and file object folders connected to the users in the organization, the identities of users sharing the file objects and the user access privilege information can be used to determine number of users outside the organization with file object write privileges and number of users outside the organization with file object folder write privileges. Based on this, an external surface exposure for the organization is calculated. The external surface exposure can be in turn used for simulating the spread of malware.

An organization collaborative risk score can be calculated for the organization based on the external surface exposure of the organization, user collaborative risk scores of the users in the organization, occurrence recency and severity of a latest spread of malware, number of managed and unmanaged devices in an organization network, and security patch level configured on organization devices. The organization collaborative risk score can be in turn used for simulating the spread of malware.

A user partition hygiene score can be calculated for a user partition based on user collaborative risk scores of the users in the user partition. The user partition hygiene score can be in turn used for simulating the spread of malware.

The visualization graphically depicts the users and the file objects, connections between the users and the file objects, connections between the file objects, and the user partitions and boundaries delineating the user partitions.

The visualization graphically depicts hygiene scores of the file objects, user collaborative risk scores of the users, user partition hygiene scores, and the organization collaborative risk score.

The visualization further includes using visual codings to distinguish between users based on malware exposure, malware infection, and malware transmission. It also includes adjusting the visual codings to provide a time-lapsed visualization of spread of the malware and evolution of some users from malware exposure to malware infection to malware transmission. This can be in turn used to replay the time-lapsed visualization.

The simulation can be iterated for a multiplicity of users being respective entry point users zero. Also, a visualization can be produced for each iteration.

The spread of malware can be simulated from multiple entry point users zero. Also, a visualization can be produced that graphically depicts the multiple entry point users zero. In some implementations, the multiple entry point users zero are co-detected within a time window. In other implementations, the multiple entry point users zero are co-infected by a common source. In such implementations, a visualization can be produced that graphically depicts the multiple entry point users zero as a single threat. In yet other implementations, the multiple entry point users zero are infected by different sources.

A prioritization scheme can be applied that prioritizes exposed or infected filed objects and exposed or infected users based on the user-by-user data and the file-by-file data. The prioritization includes identifying high value file objects that are exposed or infected based on content inspection of the file objects by a data loss or leak prevention (DLP) engine and identifying high value users that are exposed or infected at least based on one of biographic information of the high value users and their connections with the high value file objects. Also, a visualization of the prioritization can be produced on at least one of a file-by-file basis and a user-by-user basis.

Furthermore, one or more security actions are executed in response to identifying the high value file objects and the high value users. In one implementation, a security action can be quarantining the high value file objects. In another implementation, a security action can be encrypting the high value file objects. In yet another implementation, security action can be quarantining the high value users.

The simulation and the visualization can be periodically updated to reflect changes to the user-by-user data and file-by-file data.

The introspector inspects an e-mail of a user and detects a link that shares a file object with one or more external users contained in the e-mail. In response to the detection, the introspector executes a security action. In other implementations, the introspector inspects a message feed of a user and detects a link that shares a file object with one or more external users contained in a message of the message feed. In response to the detection, the introspector executes a security action.

The user endpoint vulnerability characteristics specify an operating system running on the user endpoint, whether an endpoint routing client is configured on the user endpoint, thereby identifying whether the user endpoint is managed or unmanaged, and a device type of the user endpoint.

The simulation and visualization of the spread of malware can be based on an epidemiological model. Some examples include Kermack and McKendrick compartmental models including SIR (susceptible, infected, removed) model, SAIR (susceptible, antidote, infected, removed) model, SAIC (susceptible, antidote, infected, contaminated) model, SI (susceptible, infected) model, SIS (susceptible, infected, susceptible) model, SAI (susceptible, antidote, infected) model, SLBS (susceptible, latent, breaking, susceptible) model, and SLBRS (susceptible, latent, breaking, recovered, susceptible) model.

The user-by-user data and file-by-file data can be encoded as parameters of the epidemiological model. In one implementation, the user endpoint location can be encoded as at least one of an exposure parameter, environment hostility parameter, entry point parameter, and patient zero parameter. In another implementation, the user endpoint vulnerability characteristics can be encoded as at least one of infection parameters, environment hardening parameters, and spread rate parameters. In yet another implementation, the user collaborative risk score can be encoded as at least one of exposure parameter, entry point parameter, patient zero parameter, and infection parameter. In yet another implementation, the file object hygiene score can be encoded as at least one of exposure parameter, entry point parameter, patient zero parameter, and infection parameter. In yet further implementation, the external exposure surface can be encoded as an infection parameter. In yet further implementation, the user partition hygiene score can be encoded as at least one of exposure parameter, entry point parameter, infection parameter, and spread rate parameter. In yet further implementation, the user rate of collaboration can be encoded as a spread rate parameter. In yet further implementation, the file object collaboration depth can be encoded as a spread rate parameter. In yet further implementation, the organization collaborative risk score can be encoded as a spread rate parameter. In yet further implementation, the connected user-file depth can be encoded as at least one of spread rate parameter and time for spread to complete parameter.

A rate of spread can be calculated based on the encoding described above. Also, a visualization of the rate of spread can be produced.

The visualization can be based on one or more graph layouts. Some examples of graph layouts include Kamada-Kawai, Fruchterman-Reingold, Reingold-Tilford, GEM, and Tunkelang. In one implementation, the visualization can generate a single pane of glass animation of the organization's cloud collaborativeness across the cloud-based services.

The malware spread can be initiated by ransomware. In other implementations, the malware spread can be initiated by human activity.

All the features and implementations disclosed herein for the "file objects" or "files" apply equally to "folder objects" or "folders".

Other implementations may include a non-transitory computer readable storage medium storing instructions executable by a processor to perform functions of the system described above. Yet another implementation may include a method performing the functions of the system described above.

A method implementation of the technology disclosed includes analyzing or simulating spread of malware through an organization of users who store and collaborate on files on one or more cloud-based services. The method includes collecting user-by-user data and file-by-file data regarding the users' interaction with the cloud-based services. For individual users, the user-by-user data includes user endpoint location, user endpoint vulnerability characteristics, and user file sharing information. For individual file objects, the file-by-file data includes identities of users sharing the file objects and user access privilege information.

The user-by-user data and file-by-file data is collected via a cross-application introspector with one or more API connectors to the cloud-based services. In other implementations, the user-by-user data and file-by-file data is collected via a cross-application proxy, interposed between user endpoints and the cloud-based services, which inspects the users' interaction with the cloud-based services in real-time.

Following this, the method proceeds to tracing connections among the users in the organization by traversing a directed graph constructed from the user-by-user data and the file-by-file data. Based on the directed graph, a connected user-file depth is calculated. The directed graph is also used to partition users in the organization into unconnected user partitions.

The method proceeds to simulating the spread of malware based on the directed graph. The simulation simulates the malware spread from an entry point user zero through the organization, via the cloud-based services. The simulation simulates user exposure to, infection by, and transmission of the malware within the organization.

The method concludes by producing a visualization of the malware spread. The visualization graphically depicts the malware spread from the entry point user zero, to users within a user partition to which the user zero belongs, at varying transmission distances from the user zero. The varying transmission distances are determined from the connected user-file depth.

Each of the features discussed in this particular implementation section for the system implementation apply equally to this method implementation. As indicated above, all the system features are not repeated here and should be considered repeated by reference.

All the features and implementations disclosed herein for the "file objects" or "files" apply equally to "folder objects" or "folders".

A computer readable media (CRM) implementation includes a non-transitory computer readable storage medium storing instructions executable by a processor to perform a method as described above. Another CRM implementation may include a system including memory and one or more processors operable to execute instructions, stored in the memory, to perform a method as described above.

In another CRM implementation, the technology disclosed includes a non-transitory computer readable storage medium impressed with computer program instructions to analyze or simulate spread of malware through an organization of users who store and collaborate on files on one or more cloud-based services. The instructions, when executed on a processor, implement the method described above.

Each of the features discussed in this particular implementation section for the system implementation apply equally to this CRM implementation. As indicated above, all the system features are not repeated here and should be considered repeated by reference.

All the features and implementations disclosed herein for the "file objects" or "files" apply equally to "folder objects" or "folders".

A system implementation of the technology disclosed at the level of folder objects includes one or more processors coupled to memory. The memory is loaded with computer instructions to analyze or simulate spread of malware through an organization of users who store and collaborate on folders on one or more cloud-based services. First, user-by-user data and folder-by-folder data regarding the users' interaction with the cloud-based services is collected. For individual users, the user-by-user data includes user endpoint location, user endpoint vulnerability characteristics, and user folder sharing information. For individual folder objects, the folder-by-folder data includes identities of users sharing the folder objects and user access privilege information.

The user-by-user data and folder-by-folder data is collected via a cross-application introspector with one or more API connectors to the cloud-based services. In other implementations, the user-by-user data and folder-by-folder data is collected via a cross-application proxy, interposed between user endpoints and the cloud-based services, which inspects the users' interaction with the cloud-based services in real-time.

Following this, connections among the users in the organization are traced by traversing a directed graph constructed from the user-by-user data and the folder-by-folder data. Based on the directed graph, a connected user-folder depth is calculated. The directed graph is also used to partition users in the organization into unconnected user partitions.

The directed graph is used to simulate the spread of malware. The simulation simulates the malware spread from an entry point user zero through the organization, via the cloud-based services. The simulation simulates user exposure to, infection by, and transmission of the malware within the organization.

A visualization of the malware spread is produced. The visualization graphically depicts the malware spread from the entry point user zero, to users within a user partition to which the user zero belongs, at varying transmission distances from the user zero. The varying transmission distances are determined from the connected user-folder depth.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of simulating spread of a malware in cloud applications, the method comprising:
   accessing sharing data for data objects shared between users of cloud applications;
   tracing connections between users based on the sharing data;
   simulating spread of a malware based at least in part on the traced connections and calculated scores to simulate transmission of the malware between the users, wherein:
      the malware is spread by sharing of infected ones of the data objects,
      the calculated scores comprise user risk scores calculated based at least in part on user-by-user data and object-by-object data, and
      the user risk scores comprise a collaboration score indicating a rate of collaboration of the respective user; and
   generating a time-lapse visualization of the spread of the malware.

2. The computer-implemented method of claim 1, wherein the data objects comprise files and folders.

3. The computer-implemented method of claim 1, wherein the generating the time-lapse visualization comprises:
   generating a visualization of the traced connections comprising nodes representing each of the users and edges connecting the nodes, the edges representing the traced connections;
   applying visual codings to the nodes to distinguish between the users based on exposure to the malware; and
   adjusting the visual codings to generate the time-lapse visualization indicating an evolution of a state of the users, wherein the states include malware exposure, malware infection, and malware transmission.

4. The computer-implemented method of claim 1, further comprising:
   providing the time-lapse visualization for display.

5. The computer-implemented method of claim 1, wherein the simulating is based on a first user of the users representing an entry point of the malware, the method further comprising:

repeating the simulating based on a different user of the users representing the entry point of the malware for each simulation; and
generating a plurality of time-lapse visualizations for each simulation.

6. The computer-implemented method of claim 1, wherein the simulating is based on multiple users of the users representing entry points of the malware within a time window.

7. The computer-implemented method of claim 1, wherein the sharing data comprises the user-by-user data and the object-by-object data.

8. The computer-implemented method of claim 7, wherein the user-by-user data comprises user endpoint location, user endpoint vulnerability characteristics, user data object sharing information, or a combination thereof.

9. The computer-implemented method of claim 7, wherein the object-by-object data comprises identities of users sharing the data objects, user access privilege information, or a combination thereof.

10. The computer-implemented method of claim 1, further comprising:
   tracing the connections by calculating connected user-file depth, and
   partitioning the users into unconnected user partitions.

11. The computer-implemented method of claim 10, further comprising:
   simulating the spread from an entry point user zero.

12. The computer-implemented method of claim 11, wherein the time-lapse visualization comprises visualizing the spread from the entry point user zero to users within a user partition to which the entry point user zero belongs at varying transmission distances from the entry point user zero determined from the connected user-file depth.

13. A system, comprising:
   one or more processors; and
   one or more memories having stored thereon instructions that, upon execution by the one or more processors, cause the one or more processors to:
      access sharing data for data objects shared between users of cloud applications;
      trace connections between users based on the sharing data;
      simulate spread of a malware based at least in part on the traced connections and calculated scores to simulate transmission of the malware between the users, wherein;
         the malware is spread by sharing of infected ones of the data objects,
         the calculated scores comprise user risk scores calculated based at least in part on user-by-user data and object-by-object data, and
         the user risk scores comprise a collaboration score indicating a rate of collaboration of the respective user; and
      generate a time-lapse visualization of the spread of the malware.

14. The system of claim 13, wherein the data objects comprise files and folders.

15. The system of claim 13, wherein the instructions to generate the time-lapse visualization comprise further instructions that, upon execution by the one or more processors, cause the one or more processors to:
   generate a visualization of the traced connections comprising nodes representing each of the users and edges connecting the nodes, the edges representing the traced connections;

apply visual codings to the nodes to distinguish between the users based on exposure to the malware; and adjust the visual codings to generate the time-lapse visualization indicating an evolution of a state of the users, wherein the states include malware exposure, malware infection, and malware transmission.

16. The system of claim 13, wherein the instructions comprise further instructions that, upon execution by the one or more processors, cause the one or more processors to:

provide the time-lapse visualization for display.

17. The system of claim 13, wherein the simulation is based on a first user of the users representing an entry point of the malware, and wherein the instructions comprise further instructions that, upon execution by the one or more processors, cause the one or more processors to:

repeat the simulation based on a different user of the users representing the entry point of the malware for each simulation; and generate a plurality of time-lapse visualizations for each simulation.

18. The system of claim 13, wherein the simulation is based on multiple users of the users representing entry points of the malware within a time window.

19. The system of claim 13, wherein the sharing data comprises the user-by-user data including user endpoint location, user endpoint vulnerability characteristics, user file sharing information, or a combination thereof.

20. The system of claim 13, wherein the sharing data comprises the object-by-object data including identities of users sharing the data objects, user access privilege information, or a combination thereof.

* * * * *